United States Patent
de l'Etraz et al.

(10) Patent No.: US 6,324,541 B1
(45) Date of Patent: Nov. 27, 2001

(54) SYSTEM, METHOD, AND COMPUTER PROGRAM PRODUCT FOR PROVIDING RELATIONAL PATTERNS BETWEEN ENTITIES

(75) Inventors: Paris de l'Etraz, Madrid (ES); James R. Fees, Brussels (BE); Paul Hatcher, London (GB); Otto Bruderer, Uitikon (CH); Christina M. Fees, London (GB)

(73) Assignee: BoardWalk Ltd., Hamilton (BM)

( * ) Notice: Subject to any disclaimer, the term of this patent is extended or adjusted under 35 U.S.C. 154(b) by 0 days.

(21) Appl. No.: 09/586,991

(22) Filed: Jun. 5, 2000

Related U.S. Application Data

(63) Continuation of application No. 09/245,759, filed on Feb. 8, 1999, now Pat. No. 6,073,138.

(30) Foreign Application Priority Data

Jun. 11, 1998 (NL) .................................................. 1009376

(51) Int. Cl.⁷ .................................................. G06F 17/00
(52) U.S. Cl. .............................. 707/104; 707/4; 707/102; 707/104; 705/10; 705/26; 709/201; 709/203
(58) Field of Search .................................. 707/3, 4, 102, 707/104, 7, 10; 705/1, 7, 16, 17, 26, 27; 709/201, 203

(56) References Cited

U.S. PATENT DOCUMENTS

| | | | |
|---|---|---|---|
| 5,402,474 | * 3/1995 | Miller et al. ............................. | 379/93 |
| 5,555,403 | 9/1996 | Cambot et al. ........................... | 707/4 |
| 5,572,643 | * 11/1996 | Judson ................................... | 709/218 |
| 5,628,004 | * 5/1997 | Gormley et al. ........................ | 707/104 |
| 5,666,493 | 9/1997 | Wojcik et al. ........................... | 705/26 |
| 5,737,726 | 4/1998 | Cameron et al. ........................ | 705/7 |
| 5,778,368 | * 7/1998 | Hogan et al. ............................ | 707/10 |
| 5,787,450 | * 7/1998 | Diedrich et al. ........................ | 707/513 |
| 5,892,909 | 4/1999 | Grasso et al. ........................... | 709/201 |
| 5,918,010 | 6/1999 | Appleman et al. ...................... | 709/203 |
| 5,918,214 | 6/1999 | Perkowski ............................... | 705/27 |
| 5,950,173 | 9/1999 | Perkowski ............................... | 705/26 |
| 6,052,681 | * 4/2000 | Harvey .................................... | 707/3 |

FOREIGN PATENT DOCUMENTS

| | | | |
|---|---|---|---|
| WO 98/49641 | 11/1998 | (WO) | G06F/17/60 |
| WO 99/23591 | 5/1999 | (WO) | G06F/17/60 |
| WO 99/64970 | 12/1999 | (WO) | G06F/17/60 |

OTHER PUBLICATIONS

Coffey, B., "Geo's Information Nerve Center," *Wall Street & Technology*, vol. 15, No. 12, Dec. 1997, pp. 74 and 76.

Fayyad, U.M., "Data Mining and Knowledge Discovery: Making Sense Out of Data," *IEEE Expert*, vol. 11, No. 5, Oct. 1996, pp. 20–25.

O'Sullivan, O., "Bringing your commercial customers into focus," *ABA Banking Journal*, vol. 89, No. 12, Dec. 1997, pp. 52, 54, 70 and 72.

(List continued on next page.)

*Primary Examiner*—Hosain T. Alam
*Assistant Examiner*—Shahid Alam
(74) *Attorney, Agent, or Firm*—Sterne, Kessler, Goldstein & Fox PLLC

(57) ABSTRACT

A contact intelligence data mining tool for storing, processing, displaying, and printing relational patterns between entities (e.g., business and other contacts). The tool allows proprietary individual contact data to be merged with accurate and up-to-date public information in order to explore the full scope (or sphere) of an individual's or business concern's scope of influence. It intelligently establishes and presents personal, direct contacts as well as contacts of contacts, and so on. The tool further displays, via a graphical user interface, the optimal relationship path (i.e., contact pathway) to reach desired contacts.

14 Claims, 33 Drawing Sheets

OTHER PUBLICATIONS

International Search Report for PCT Appl. No. PCT/IB99/01090.

Macroview Communications Corp., sixdegrees, www.sixdegrees.com/, 6 Pages, visited and printed on Feb. 8, 1999.

Janna Systems Inc., "Providing Collaborative Relationship Management for the Enterprise with the Latest Microsoft Technologies," Janna Contact Enterprise SQL Serve Edition, 3 Pages, Nov. 7, 1996.

Pivotal Software Inc., "Pivotal Relationship Version 2 delivers rapid, enterprise–wide deployment," Press Release Announcing Relationship version 2, 3 Pages, Mar. 18, 1997.

Huffmann, S. and Baudin, C., "Notes Explorer: Entity–Based Retrieval in Shared, Semi–Structured Information Spaces," *Proceedings of the 1996 ACM CIKM. International Conference on Information and Knowledge Management*, pp. 99–106, Nov. 12–16, 1996.

Janna Systems Inc., "Enterprise Info Sheet," Janna Contact Enterprise, 5 Pages, 1999.

Six pages from http://www.oakland.edu/, "The Erdös Number Project," visited Feb. 14, 2001.

Fifteen pages from http://www.cs.virginia.edu/oracle/, "The Oracle of Bacon at Virginia," visited Feb. 14, 2001.

\* cited by examiner

SYSTEM, METHOD, AND COMPUTER PROGRAM PRODUCT FOR PROVIDING RELATIONAL PATTERNS BETWEEN ENTITIES

CROSS-REFERENCE TO OTHER APPLICATION

This application is a continuation of U.S. patent application Ser. No. 09/245,759, filed Feb. 8, 1999, now U.S. Pat. No. 6,073,138, which claimed priority to Netherlands Patent No. 1009376, filed Jun. 11, 1998.

BACKGROUND OF THE INVENTION

1. Field of the Invention

The present invention relates generally to computer data and information systems, and more particularly to a computer tool for storing, processing, and displaying contact information.

2. Related Art

In today's technological climate, the availability of computers, telecommunications, and related technology has dramatically changed the way that business is conducted. For example, the explosion of people connected to the global Internet has dramatically increased the usage of electronic mail (e-mail) for business communications. Further, the development of high speed data networks has increased the use of video conferencing centers and related equipment for business meetings.

The rapid advancement of technology has increased the speed and reliability in which business persons can communicate with each other. Fortuitously, the increase in speed and reliability has been accompanied by a decrease in associated costs. The use of e-mail, for example, saves telephone, facsimile, and shipping, costs. Similarly, the use of video conferencing saves travel costs and time.

The above noted examples are just a few among the many instances of how today's technological advances have changed the business environment. There is one aspect of business, however, that has not been affected (or aided) by today's technological advances. That aspect can be characterized as the "business relationship." More specifically, business persons depend heavily, and attribute their successfulness, on their relationships with people—known commonly as their "contacts." It is not a secret that in all human endeavors, the difference between failure and success often depends on not "what you know," but "who you know." Put quite simply, contacts (i.e., human capital) are important.

Today, every person keeps a list of their contacts in some fashion (e.g., address book, Rolodex® card tray files, electronic files, contact manager software, in their own memory, etc.). Each person typically regards their list of contacts as confidential (i.e., proprietary). This is typically true regardless of whether the person is a solo entrepreneur, part of a multi-national corporation, or a participant in any endeavor. Thus, when a business person thinks of a new venture, a common thought is: "How can I get to XYZ Company who can help me?" or "Who do I know at XYZ Company?" Similarly, when a group of business persons from the same company get together to plan a venture, a common question is: "How can we get to XYZ Company who can help us?" or "Who do we know at XYZ Company?" These questions are then followed by a series of: "Well, I know Mr. D at ABC Company who may know Ms. W at XYZ Company."

This problem is further compounded by cultural considerations. More specifically, in the United States business persons may decide to reach a company where they have no contacts (or where they may have a contact but unaware of such contact) with a "cold call." Cold calls are unsolicited business telephone calls from an unknown person. This business practice, however, is not acceptable and disfavored in certain cultures (e.g., Asia, Middle East, etc.). Thus, without the cold call option, having a contact into a company becomes even more important.

Further, business persons typically are aware of the persons (i.e., contacts) they require to meet or how to reach them via their personal contacts. That is, many business persons have a regional (i.e., territorial) or a specific business field knowledge-base. In today's global economy, however, businesses much reach and exploit cross-border and cross-industry opportunities. Thus, once again, having a contact into a company is shown to be important.

In the above "how do I [or we] get to XYZ Company" or "Who do I [or we] know at XYZ Company?" process, another series of time-consuming steps usually occurs. Typically, a company may employ a research assistant to search publicly available databases to ascertain who are the top-level persons (e.g., CEO, CFO, Chairperson, President, Board member, etc.) at XYZ Company. This may involve checking such sources as corporate reports available from sources such as, for example, D&B Million Dollar Directory® database of the top 50,000 public and private U.S. companies available from the Dun & Bradstreet Corporation of Murray Hill, N.J., the Amadeus database on the top 200,000 companies in Europe available from Bureau van Dijk Electronic Publishing S.A., London, United Kingdom, or publications such as the countless "Who's Who" directories. After the research assistant produces a list of names, each person within the group must then check their personal contact list to see if they know any of the top-level persons at XYZ Company directly, or if they can "reach" those top-level persons indirectly via someone they know.

This inefficient process is further flawed, in the example of a group of business persons from the same company, considering that the "right" people may not even be present at the meeting. That is, a business person within the corporation may know a top-level person at XYZ Company, but that person may not be at the meeting and the persons who are at the meeting will have no knowledge of the absent person's (proprietary) contacts.

A second flaw, in both the entrepreneurial or organizational examples, is that individuals often do not remember in most instances who all their contacts are. That is, there is a human factor involved in recalling "I know so and so at so and so company," or "so and so knows so and so." This flaw is especially true considering the significant amount of people who currently retain their private contact information in memory rather than electronic file or simply an address book.

Yet a third flaw is the dependency on inaccurate public information databases and publications which may contain imprecise and/or out-of-date information. This requires the entire manual process to be repeated when it is eventually learned that a contact is no longer associated with an organization, or any other mistake in the process occurred.

While the above discussion speaks in terms of a solo entrepreneur or a group of business persons within an corporation, the same "how do I [or we] get to XYZ Company" or "Who do I [or we] know at XYZ Company?" problem is experienced by many entities. Such entities include, for example, individuals, partnerships, national corporations, multi-national corporations, trade organizations, lobbying firms, job-placement agencies, fund-raising organizations, universities, and the like. That is, any entity that utilizes (and needs) contacts to successfully operate and thrive are all faced with the above-described problem. In sum, entities currently do not take full advantage of their personal contacts, intra-entity contacts, and the contacts of their contacts. Thus, businesses and other endeavors arc presently underutilizing one of the greatest assets an entity can possess—human relationships and human capital.

Therefore, what is needed is a system, method, and computer program product for providing relational patterns between entities. Such a system, method, and computer program product should allow individual (or proprietary) contact data to be merged with accurate and up-to-date public information in order to explore the full scope of an individual's or business concern's sphere of influence. Because presently, there is never a lack of information, but a lack of correlation and presentation of information, the system, method, and computer program product should intelligently establish and present the contacts of contacts and further display (and print) the optimal relationship path to reach desired contacts (i.e., persons or organizations).

SUMMARY OF THE INVENTION

The present invention meets the above-mentioned needs by providing a system, method, and computer program product for providing relational patterns between entities.

The contact intelligence data mining system for allowing a user to display (and print) their sphere of influence, includes a graphical user interface, a public information database containing data on the members of a plurality of entities in which the user has an interest in, and a private contact information database containing the personal contacts of the user. The system also includes software code logic for accessing, in response to receiving a request from the user via the graphical user interface, the public and private databases, and software code logic for processing accessed information located in the databases in order to display a contact pathway.

The contact pathway is a graphical representation of the relational patterns between the user and the entities (through the persons associated with those entities) in the public and/or private databases. It represents the user's sphere of influence and includes the user's contacts, the contacts of the user's contacts, and so on.

The method for providing a contact pathway, according to an embodiment of the present invention, includes the steps of receiving an organization and/or person's name input, searching the public and/or private databases for associations between the user and the organization and/or person, and causing a contact pathway to be displayed. The contact pathway report is then used by the user to determine the how to reach the contact organization and/or person.

One advantage of the present invention is that a rich mixture of both public and private information is presented, allowing a user to intelligently establish and present the contacts of their contacts and further display the optimal relationship path (i.e., contact pathway) to reach other desired contacts. The optimal path presented is based on the degree of familiarity each person has (e.g., friends, golfing buddies, casual acquaintance, etc.) with the next person along the contact pathway.

Another advantage of the present invention is that relationships or associations for contacts are established, using public information, through common memberships on company boards of directors, university alumni clubs, political party organizations, trade groups, social clubs, military branches, and the like.

Another advantage of the present invention is that different public databases may be utilized, singly or jointly, and then combined with an entity's private contact data to obtain different spheres of influences for different purposes.

Another advantage of the present invention is that users may enter new contact names in their private contact database, as they meet new people, and ascertain, using the public database(s), their updated sphere of influence.

Yet another advantage of the present invention is that the private contact data of each individual within a business concern (i.e., organization, corporation, and the like), may be put into use to benefit the concern as a whole, while providing different levels of security to protect each individual's private data.

Yet another advantage of the present invention is that a user can establish the scope of influence of even persons not known to them in order to estimate the scope of influence they can reach if they meet such persons.

Yet another advantage of the present invention is that a user may enter a private link between persons or organizations within the public database based on proprietary information they possesses. This thereby allows more (optimal) contact pathways to be generated.

Further features and advantages of the invention as well as the structure and operation of various embodiments of the present invention arc described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

TABLE OF CONTENTS

Figure 1A:
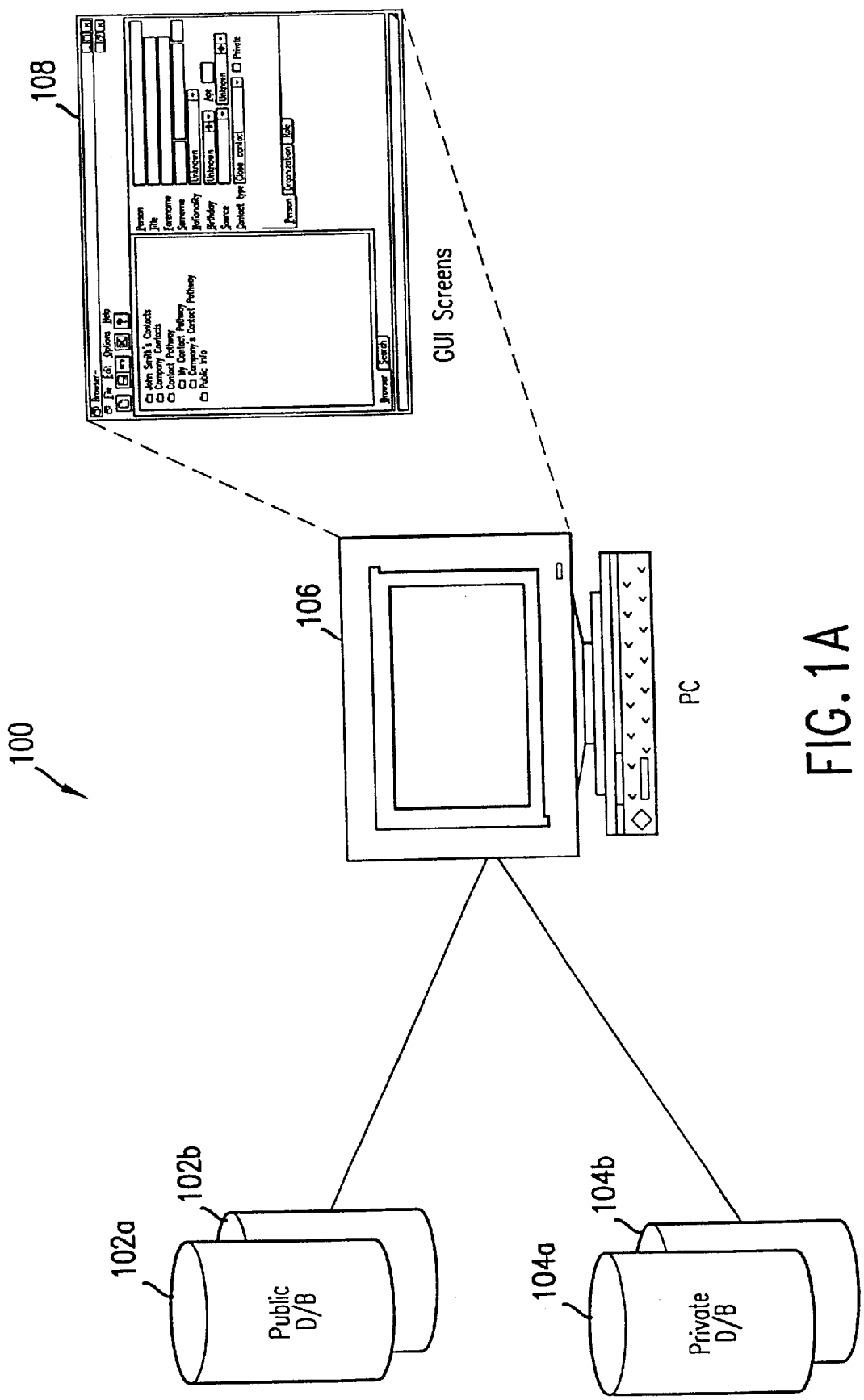
FIGS. 1A–1C are block diagrams illustrating the system architecture of various embodiments of the present invention, showing connectivity among the various components.

I. Overview
II. System (and Internet) Architecture
   A. Stand-Alone Embodiments
   B. Enterprise Embodiments
   C. General Considerations
III. Software Architecture
IV. General System Characteristics
   A. Data Representation
   B. Private Contact Data Input
   C. Safeguarding Data
   D. Updating Data
V. Detailed Example of System Operation
   A. Browser Modes
      1. User's Contacts
      2. Company Contacts
      3. Contact Pathway
      4. Public Information
   B. Search Modes
      1. Person
      2. Organization
      3. Person at an Organization (Target)
   C. Detailed Search Flow Example
   D. Optimal Contact Pathways
VI. Example Implementations
VII. Conclusion

I. Overview

The present invention relates to a system, method, and computer program product for providing relational patterns between entities (e.g., individuals, partnerships, national corporations, multi-national corporations, trade organizations, lobbying firms, job-placement agencies, fund-raising organizations, universities, and the like).

In an embodiment of the present invention, a stand-alone application program is provided which serves as an contact intelligence data mining tool. The application program allows a user (e.g., business person) to enter and store their private contact information. The contact intelligence data mining tool would also have access to a database containing publicly available information concerning multi-national corporation boards of directors. The data mining tool would allow the user to intelligently establish the contacts of their contacts and display, via a graphical user interface (GUI), the optimal relationship path to reach other desired contacts (i.e., their optimal "contact pathway"). A contact pathway is a graphical representation of the relational patterns between the user and the entities in the public and/or private databases. Further functionality of the tool includes allowing the user to learn the full sphere of their influence, and to learn their potential sphere of influence if the user were to create contacts with specific, yet presently unknown, persons, In an alternate embodiment of the present invention, the application program would be networked among the local or wide area network (e.g., over an Ethernet, intranet, or extranet) of an entity allowing multiple users to access and use the contact intelligence data mining tool. This enterprise embodiment would allow several sets of private data to be stored and thus matched to the public corporate contact information database to establish even wider spheres of contacts (i.e., influence). That is, not only can each member or employee of the entity find out there personal spheres of influence (i.e., contacts and contacts of their contacts), but this could be done on an entity level. Such a network version of the data mining tool would also include security measures to allow, for example, managers to access employees' private contact data, but disallow employees to access manager or fellow employee private contact data.

In each of the two above-described alternate embodiments, the contact intelligence data mining tool may be run, instead of locally or on proprietary equipment, via the global Internet. In such an embodiment, a contact intelligence service provider would allow access, on a subscriber per-use basis, to the contact intelligence data mining tool via a World-Wide Web (WWW) site on the Internet. That is, both stand-alone users or enterprise users may subscribe to the contact intelligence service provider's WWW site and pay on a per-use basis.

Also, in each of the two above-described alternate embodiments, an accurate database of public information (i.e., memberships on company boards of directors) can be provided by the contact intelligence service provider that would allow users to reliably merge their private contact data in order to ascertain their precise and up-to-date sphere of influence. Such public information database would be consistently researched and periodically updated by the service provider. The updated public information database, in order to provide the desired reliability, may then be distributed to subscribers (i.e., users) via several different means (e.g., electronic media, via Internet or FTP download, or automatically upon Internet access).

The present invention solves the above-described "how do I [or we] get to XYZ Company?" or "who do I [or we] know at XYZ Company?" problem by providing a contact pathway that maps how to get to certain persons and organizations. This is useful in today's global economy as the contact pathway supplants the "cold call," while also broadening the regional and business field focus of the user.

The present invention is described in terms of the above examples. This is for convenience only and is not intended to limit the application of the present invention. In fact, after reading the following description, it will be apparent to one skilled in the relevant art(s) how to implement the following invention in alternative embodiments (e.g., public information databases, used singly or jointly, containing data on university alumni clubs, political party organizations, trade groups, social clubs, military branches, members of a legislature, and the like).

The terms "user," "subscriber," "person," "entity," "company," "business concern," and the plural form of these terms are used interchangeably throughout herein to refer to those who would access, use, and thus benefit from the contact intelligence data mining tool of the present invention.

II. System (and Internet) Architecture

A. Stand-Alone Embodiments

Referring to FIG. 1A, a block diagram illustrating the physical architecture of a contact intelligence data mining (CIDM) system 100, according to an embodiment of the present invention, showing connectivity among the various components, is shown. The embodiment of FIG. 1A represents the stand-alone, locally-run version of the CIDM tool.

The CIDM system 100 includes a public information database 102 and a private contact information database 104. In an embodiment of the present invention, these two databases can be mirrored for fault tolerance and thus shown as databases 102a–b and 104a–b. The CIDM system 100 also includes a personal computer (PC) 106 (e.g., an IBM™ or compatible PC workstation running the Microsoft® Windows 95/98™ or Windows NT™ operating system, Macintosh® computer running the Mac® OS operating system, or the like), connected to the databases 102 and 104. The CIDM tool would execute (i.e., "run") on the PC 106 and during its operation provide users a graphical user interface (GUI) "front-end" screens 108. In general, PC 106 may be any processing device including, but not limited to, a desktop computer, laptop, palmtop, workstation, set-top box, personal data assistant (PDA), and the like.

Figure 1B:
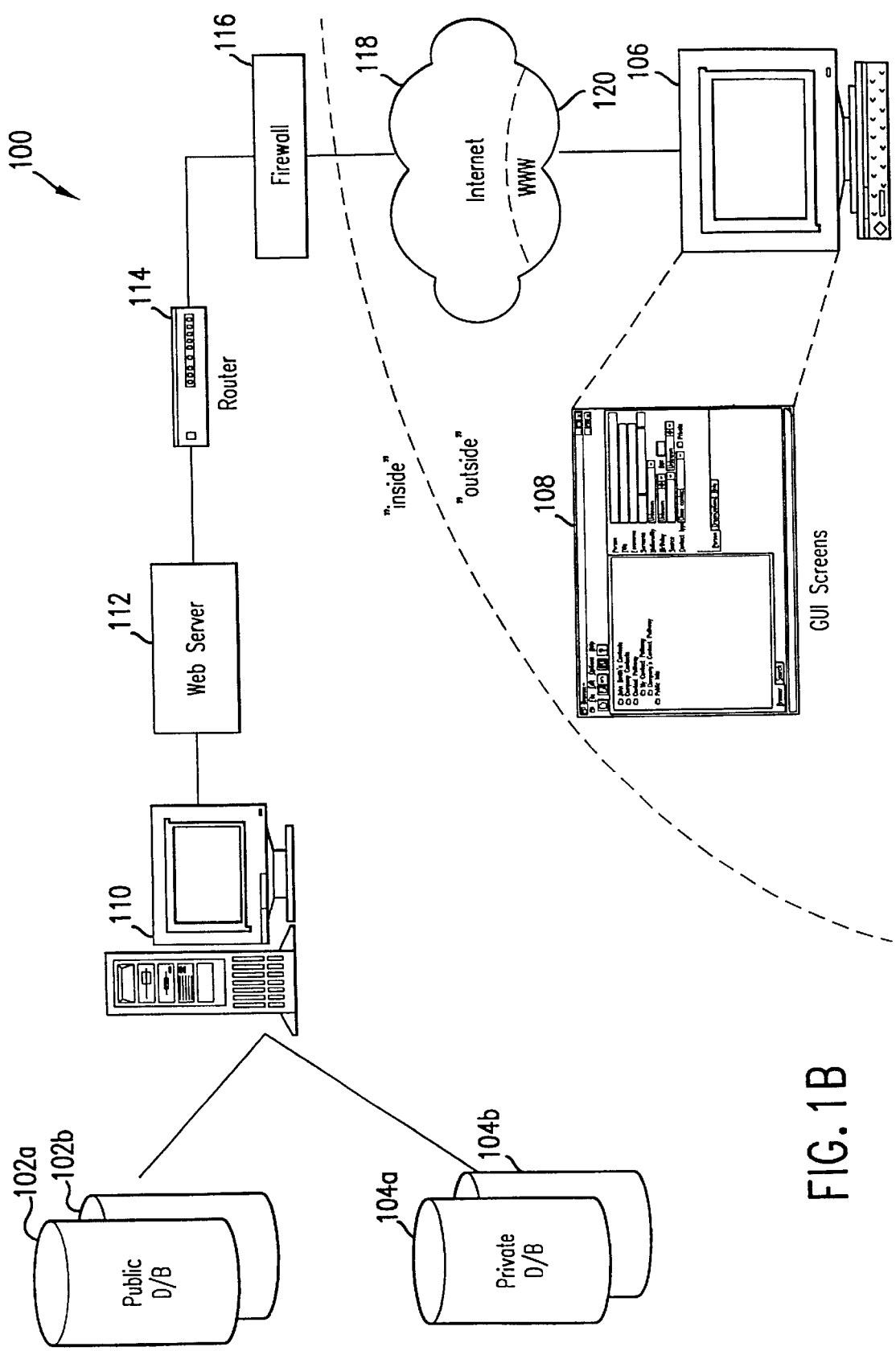

Referring to FIG. 1B, a block diagram illustrating the physical architecture of a CIDM system 100, according to an embodiment of the present invention, showing network connectivity among the various components, is shown. The embodiment of FIG. 1B represents the stand-alone, Internet subscriber version of the CIDM tool.

As explained above, the CIDM)M system 100 includes a public information database 102 and a private contact information database 104. In an embodiment of the present invention, these two databases can be mirrored for fault tolerance and thus shown as databases 102a–b and 104a–b.

The components of the CIDM system 100, as shown in FIG. 1B, are divided into two regions—"inside" and "outside." The components appearing in the inside region refer to those components that the contact intelligence service provider would have as part of their infrastructure in order to provide the tools and services contemplated by the present invention. As will be apparent to one skilled in the relevant art(s), all of components "inside" of the CIDM system 100 are connected and communicate via a wide or local area network (WAN or LAN) running a secure communications protocol (e.g., secure sockets layer (SSL)).

The CIDM system 100 includes a server 110 which serves as the "back-bone" (i.e., CIDM processing) of the present invention. The CIDM system 100 includes a second server 112 which provides the "front-end" for the CIDM system 100. The server 112 is a typical Web server process running at a Web site which sends out web pages in response to Hypertext Transfer Protocol (HTTP) requests from remote browsers (i.e., subscribers of the contact intelligence service provider). That is, the server 112 provides the GUI to users of the CIDM system 100 in the form of Web pages. These Web pages sent to the subscriber's PC 106 would result in GUI screens 108 being displayed. In an embodiment of the present invention, the server 112 would be implemented using a Windows NT# server platform.

The server 112 is connected to a router 114. As is also well known in the relevant art(s), routers forward packets between networks and are available from many vendors such as Cisco Systems, Inc. of San Jose, Calif. The router 114 forwards network packets from inside the inside region of system 100 to the outside over the Internet 118.

The connection to the Internet 118, which includes the WWW 120, however, is through a firewall 116. The firewall 116 serves as the connection and separation between the LAN 101, which includes the plurality of network elements (i.e., elements 102–116) "inside" of the LAN 101, and the global Internet 118 "outside" of the LAN 101. Generally speaking, a firewall is a dedicated gateway machine with special security precaution software. It is typically used, for example, to service Internet 118 connections and dial-in lines and protects the cluster of more loosely administered network elements hidden behind it from external invasion. Firewalls are well known in the relevant art(s) and are available from many vendors such as Check Point Software Technologies Corporation of Redwood City, Calif.

As will be appreciated by those skilled in the relevant art(s), this configuration of router 114, firewall 116, and Web server 112 is flexible and can be omitted in certain embodiments. Additional routers 114 and/or firewalls 116 can also be added.

B. Enterprise Embodiments

Figure 1C:
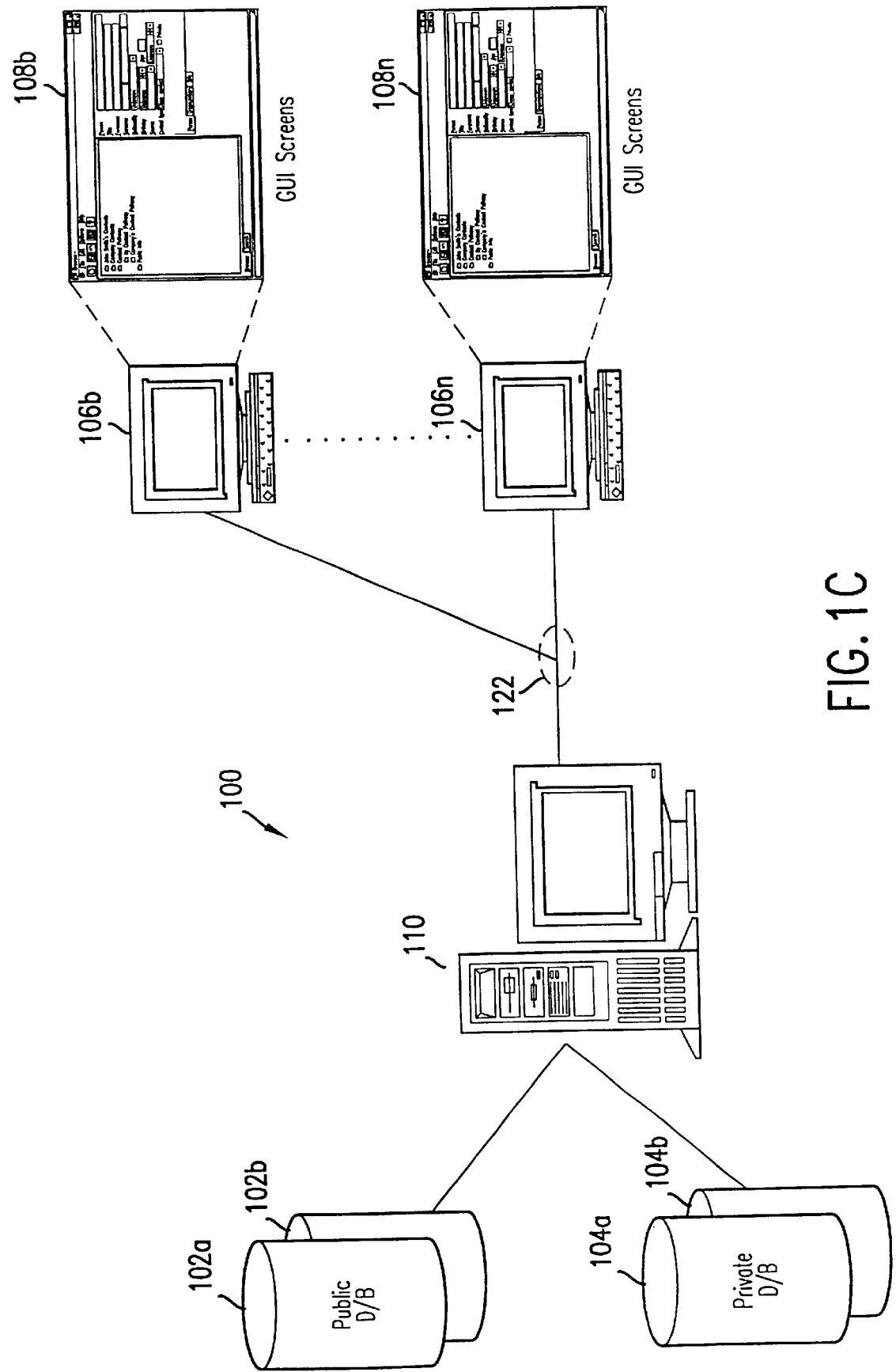

Referring to FIG. 1C, a block diagram illustrating the physical architecture of a CIDM system 100, according to an embodiment of the present invention, showing network connectivity among the various components, is shown. The embodiment of FIG. 1C represents the enterprise, locally-run version of the CIDM tool.

As explained above, the CIDM system 100 includes a public information database 102 and a private contact information database 104. In an embodiment of the present invention, these two databases can be mirrored for fault tolerance and thus shown as databases 102a–b and 104a–b.

The CIDM system 100 includes a server 110 which serves as the "back-bone" (i.e., CIDM tool processing) of the present invention. The front-end of the system 100 would be provided by a plurality of PCs 106 (shown as PC 106a–n).

During operation of the CIDM tool, the PCs 106 provide a GUI "front-end" screens 108 (shown as GUIs 108a–n) to the several users.

As will be apparent to one skilled in the relevant art(s), all of components of the CIDM system 100 are connected and communicate via a WAN or LAN 122. Further, in alternate embodiments of the present invention, aside from an Ethernet LAN implementation, the system 100 may be implemented as an intranet or extranet.

As will be apparent to one skilled in the relevant art(s), the Internet subscriber, enterprise version of the CIDM tool will resemble the architecture of the system 100 presented in FIG. 1B. A notable exception, in one embodiment of the present invention, would involve the contact intelligence service provider supplying an infrastructure where each enterprise subscriber's private database 104 would be separated and secured from other subscribers' private contact data information.

C. General Considerations

While two separate databases (i.e., databases 102 and 104) are shown in FIGS. 1A–1C for ease of explanation, it will be apparent to one skilled in the relevant art(s) that the CIDM system 100 may utilize databases physically located on one or more computers which may or may not be the same as the PC 106 or sever 110, as applicable.

In a preferred embodiment of the present invention, as described below in greater detail, databases 102 and 104 would reside on the same physical media, but separated as two virtual databases. Further, in alternate embodiments, CIDM system 100 can utilize many different schemes for allocating where the public and private data physically resides within the system. For example, in the Internet subscriber embodiments of the present invention, the private contact information database 104 may reside locally (i.e., within PC 106), while the public information database(s) 102 reside within the contact intelligence service provider's infrastructure and made accessible to the server 110.

The enterprise versions described above, in an alternative embodiment, may also have three levels of private contact data stored within private database 104 which the CIDM system 100 may utilize. The first level would be the entity's private contact data which includes the private contact data of each of the enterprise users who have shared their data with the entity as a whole. The second level of private contact data includes the entity's entity-wide private contact data. This type of private contact data is not based from personal relationships, but from an organization's perspective. For example, persons attending a conference sponsored by an entity may fill out an attendance or survey form. These forms may be entered into the private contact database 104 and referred to herein as the second level data. A third level includes each user's private data that they consider top secret and decide not to share with the entity as a whole. All the levels of private data may be used to generate the user's and the entity's contact pathway. However, when the third (top secret) level of contact data is used to generate the entity's contact data, the displayed contact pathway will not display any secret links along the pathway without the permission of the user who "owns" the data corresponding to that contact link in the contact pathway (see the Private field of the PersonRelation TABLE 318).

It should be understood that the particular embodiments of the contact intelligence data mining system 100, as shown in FIGS. 1A–1C are for illustrative purposes only and do not limit the present invention. For example, two of the above-mentioned versions of the CIDM system 100 (stand-alone and enterprise), in an alternative embodiment, may be accessible via telephone services or the like, rather than the Internet 118. As another example, the CIDM system 100 may be accessible via a corporate intranet (without the need for a firewall 116) or extranet rather than solely through the Internet 118. Further, referring to FIGS. 1A–1B, in an embodiment of the present invention, databases 102a–b, respectively, can be the above-mentioned multi-national corporation board of directors database 102a used in conjunction with a university alumni public information databases 102b.

III. Software Architecture

Figure 2:
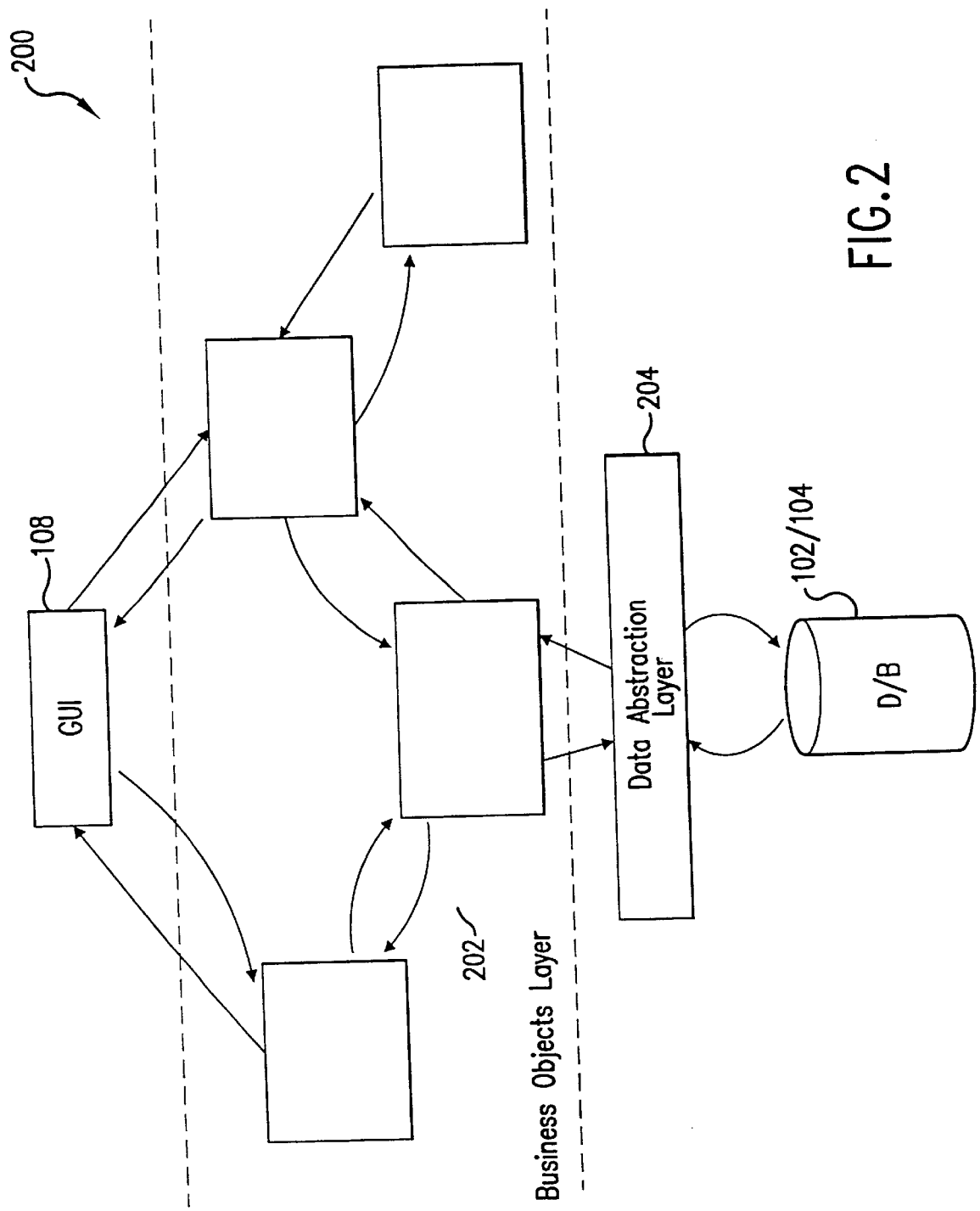
FIG. 2 is a block diagram illustrating the software architecture of an embodiment of the present invention, showing communications among the various components.

Referring to FIG. 2, a block diagram illustrating a software architecture 200 according to an embodiment of CIDM system 100, showing communications among the various components, is shown. Software architecture 200 is a layered architecture which includes the GUI 108 framework layer, a business objects layer 202, and a data abstraction layer 204. The data abstraction layer 204 manages access to the databases 102 and 104. As is well known in the relevant art(s), a layered architecture allows each layer of the software architecture to be designed, written, and re-implemented independently of the other layers.

The software architecture 200 of CIDM system 100 (i.e., all layers 108, 202, and 204) includes software code (control) logic that implements the present invention and runs on the PC 106 and, in the case of the enterprise embodiments, the server 110. The code provides the user with the functionality to intelligently browse and establish the contacts of their contacts and display the optimal relationship path to reach other desired contacts (i.e., contact pathway), etc.

In an embodiment of the present invention, the code logic is implemented in an object-oriented programming language that contains "objects," which are a set of data structures encapsulated with a set of routines called "methods" which operate on the data. Thus, the architecture follows an open architecture standard for object-oriented programming languages such as, for example, the Common Object Model (COM) or the Common Object Requests Broker Architecture (CORBA), which are both well known in the relevant art(s).

In an embodiment of the present invention, the software code is written in a high-level programming language such as the Visual BASIC (VB) programming language. VB is an event-driven programming language that allows code to be invoked when a user performs certain operations on graphical on-screen objects. Thus, the use of a programming language such as VB facilitates the browsing and search functions (explained below) of the GUI screens 108.

Layer 202 is composed of a number of components or packages that encompass one or more pieces of functionality required to implement the system. Each component is comprised of one or more classes (the static definition of an object), and the decision as to which class is contained in which component is a design issue and is usually resolved so that related areas of functionality are kept within a single component. This, as with the layered implementation of the architecture, allows portions of an application written in an object-oriented manner to be redesigned independently of other components.

For example, in an embodiment where the database is implemented using relational technology, the architecture of the CIDM tool is based around the object-oriented paradigm whereas the database implementations use a relational paradigm. This leads to a problem known in the art as the object-relational impedance mis-match. Layer 204 provides a mechanism to translate the objects within the application to a relational form and additionally insulates the rest of the architecture from differences in implementation of the different databases in the various embodiments of the system.

In an embodiment where the database is implemented using object database technology, layer 204 provides a mechanism to insulate the rest of the architecture from differences in implementation of the different databases in the various embodiments of the system.

In an embodiment of the present invention, the software code communicates with the databases 102 and 104 using the Open Database Connectivity (ODBC) interface. As is well known in the relevant art(s), ODBC is a standard for accessing different database systems from a high level programming language application. It enables these applications to submit statements to ODBC using an ODBC structured query language (SQL) and then translates these to the particular SQL commands the underlying database product employs. In an alternate embodiment, the CIDM processing software communicates with the databases 102 and 104 using the Active Data Objects (ADO) interface.

In an embodiment of the present invention, the databases 102 and 104 are implemented using a relational database product (e.g., Microsoft® Access, Microsoft® SQL Server, IBM® DB2®, ORACLE®, INGRES®, or the like). As is well known in the relevant art(s), relational databases allow the definition of data structures, storage and retrieval operations, and integrity constraints, where data and relations between them are organized in tables. Further, tables are a collection of records and each record in a table possesses the same fields.

In an embodiment of the present invention, the databases 102 and 104 are implemented using an object database product (e.g., Ode available from Bell Laboratories of Murray Hill, N.J., POET available from the POET Software Corporation of San Mateo, Calif., ObjectStore available from Object Design, Inc. of Burlington, Mass., and the like). As is well known in the relevant art(s), data in object databases are stored as objects and can be interpreted only using the methods specified by each data object's class.

IV. General System Characteristics

A. Data Representation

In a preferred embodiment of the present invention, as described below in greater detail, databases 102 and 104 would reside on the same physical media and separated as two virtual databases. Thus, the private database 104 (whose data are imported in batch or entered manually), as well as the public database(s) 102 will share similar structures within, in an embodiment, the relational database. That is, the relational tables and fields within the databases 102 and 104 would be identical. This allows greater speed of performance and reduces the complexity in implementing the CIDM system 100. As will be apparent to one skilled in the relevant art(s), the separation of public and private data may be accomplished by using a "OwnerId" identifier within the virtual database (see TABLE 1F below). The use of the "record owner" identifier, serves not only to separate public and private data, but to separate the private contact data among the (possible) several users of the CIDM system 100 in the enterprise embodiments described above (i.e., with reference to FIG. 1C).

Figure 3A:
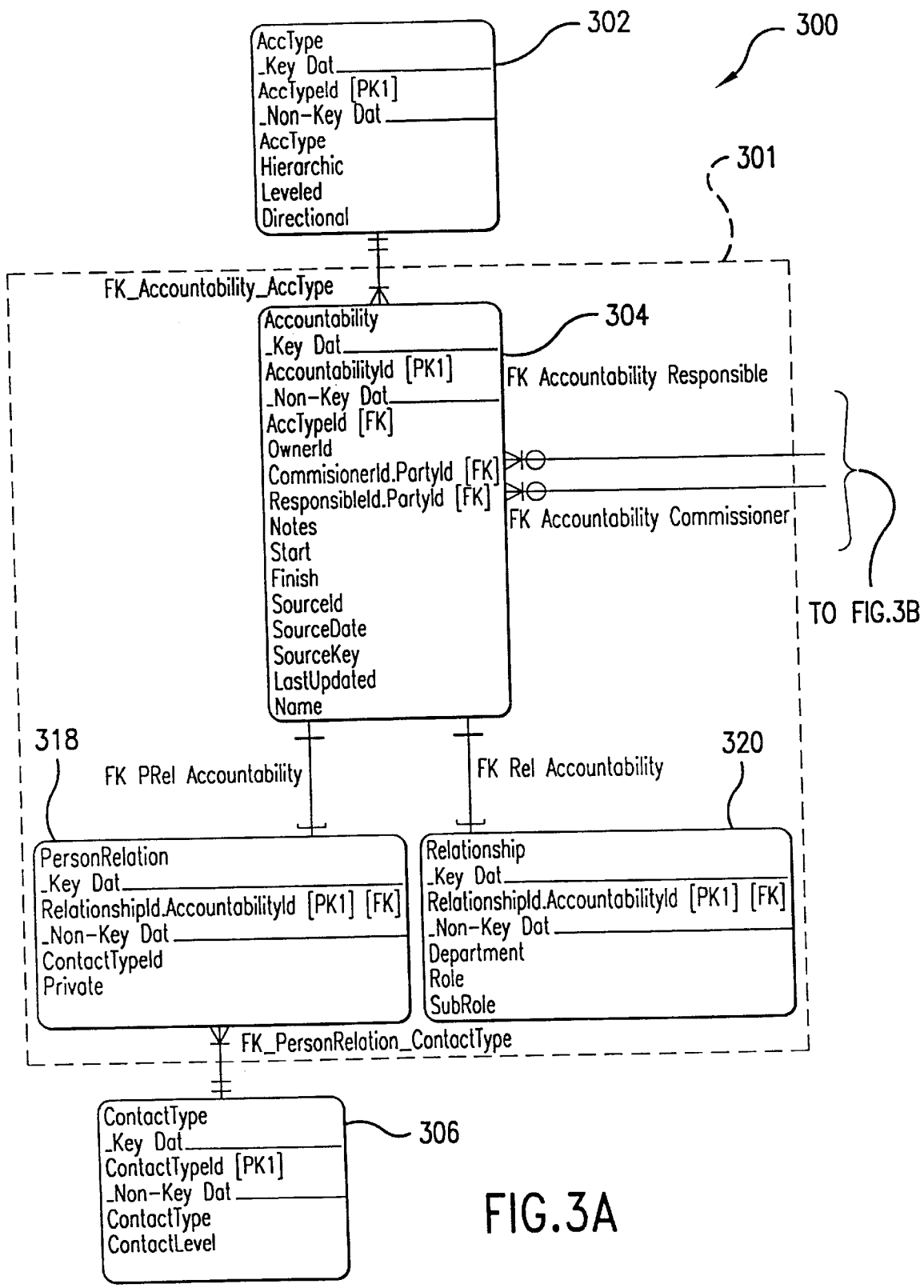
FIG. 3 is an Entity-Relationship diagram of example relational database tables according to an embodiment of present invention.
Figure 3B:
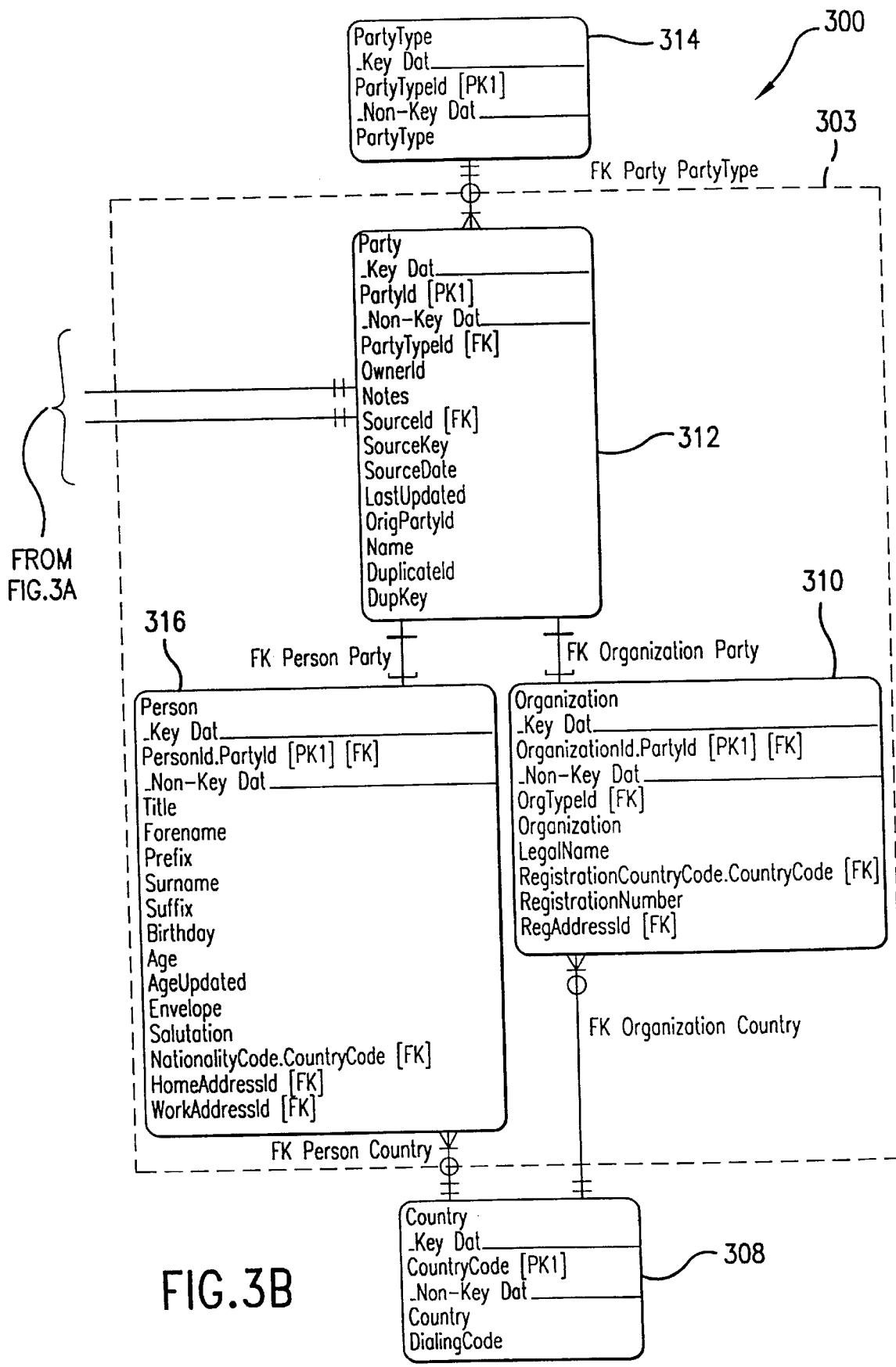

Given the foregoing, in an embodiment of the present invention, the virtual database that includes databases 102 and 104 may be organized into ten essential relational tables with associated fields as shown in FIG. 3, and summarized in TABLES 1A–1J below, respectively. The key data field for each table is denoted by a "*".

An Acc Type table 302 describes the types of accountability in the databases 102 and 104. TABLE 1A describes its fields:

TABLE 1A

ACCTYPE TABLE 302

| FIELD | DESCRIPTION |
| --- | --- |
| *AccTypeId | Identifies an accountability type |
| AccType | Name of the accountability type |
| Hierarchic | Boolean field for describing accountability type |
| Directional | Boolean field for describing accountability type |
| Leveled | Boolean field for describing accountability type |

An Accountability table 304 contains accountabilities which describes the situation when a person or organization is responsible to another. The Accountability table 304 is an abstract notion than can represent many specific issues, depending upon a particular context, including organization structures, contracts and employment. TABLE 1B describes its fields:

TABLE 1B

ACCOUNTABILITY TABLE 304

| FIELD | DESCRIPTION |
| --- | --- |
| *AccountabilityId | Identifies an accountability |
| AccTypeId | Identifies an accountability type |
| OwnerId | Owner of the record, this is ranged over party with a special value denoting the various owners of the public database(s) 102 |
| CommissionerId | The owner of relationship in an accountability for example, the employer in an employment relationship |
| ResponsibleId | The party responsible to the commissioner in an accountability, for example the employee in an employment relationship |
| Notes | Any general description about the record |

TABLE 1B-continued

ACCOUNTABILITY TABLE 304

| FIELD | DESCRIPTION |
| --- | --- |
| Start | The start date of an accountability, for example the date of appointment to a board of directors |
| Finish | The finish date of an accountability, for example the date a board membership was terminated |
| SourceId | Identifies an information source, for examples Annual Report, Reuters, Newspaper |
| SourceDate | Date of the information in the source, for example the publication date of an annual report or newspaper |
| SourceKey | Key derived from the information source, for example the year of the annual report, the title of a newspaper |
| LastUpdated | Date the information was last updated |
| Name | Short label for displaying purposes of that Accountability (e.g., director). |

A ContactType table 306 describes the contact types known to the system 100. TABLE 1C describes its fields:

TABLE 1C

CONTACTTYPE TABLE 306

| FIELD | DESCRIPTION |
| --- | --- |
| *ContactTypeId | Identifies a contact type |
| ContactType | Description of a contact type for example "Casual acquaintance" |
| ContactLevel | Numeric weighting to allow ranking of different contact Types |

A Country table 308 contains all countries known to the system 100 and TABLE 1D describes its fields:

TABLE 1D

COUNTRY TABLE 308

| FIELD | DESCRIPTION |
| --- | --- |
| *Country Code | Identifies a country |
| Country | Name of country |
| DialingCode | International dialing code |

An Organization table 310 describes an organization known to the system 100. This includes both the public database 102 and user-specified values. TABLE 1E describes its fields:

TABLE 1E

ORGANIZATION TABLE 310

| FIELD | DESCRIPTION |
| --- | --- |
| *PartyId | Identifies a party |
| OrgTypeId | FK to party type; allows the classification of organizations (e.g., charity, social, etc.) |
| Organization | Name that the organization is known as generally or to the user |
| LegalName | Legal name of an organization |
| CountryCode | Identifies a country |
| RegistrationNumber | Registration number of organization in its home country |
| RegAddressId | FK to an address table where address string is stored |

A Party table 312 describes a party entity which is the supertype of person and organization. TABLE 1F describes its fields:

TABLE 1F

PARTY  
TABLE 312

| FIELD | DESCRIPTION |
|---|---|
| *PartyId | Identifies a party |
| PartyTypeId | Identifies a party type |
| OwnerId | Owner of the record, this is ranged over party with a special value denoting The public database 102 |
| Notes | Any general description about the record |
| SourceId | Identifies an information source, for examples Annual Report, Reuters, Newspaper |
| SourceKey | Key derived from the information source, for example the year of the annual report, the title of a newspaper |
| SourceDate | Date of the information in the source, for example the publication date of an annual report or newspaper |
| LastUpdated | Date the information was last updated |
| OrigPartyId | Reference from one party object to another so as to link multiple copies or versions of the same item. Allows a different record to be kept as the private copy of the data, e.g., "I known the person's home address which is not public knowledge." Company names and details evolve over time, so the need to track old names of entities exists. |
| Name | Short text label for display purposes of that party |
| DuplicateId | References any record that is a duplicate of the current party |
| DupKey | Calculated value to estimate whether the value is duplicated by another party |

A PartyType table 314 describes the various types of parties in the system 100. This allows the CIDM system 100 to subdivide the concepts of person and organization further. For example, a party type of "Department" could be used to denote a sub-unit of an organization or a party type of "Division" could be used to denote an aggregation of departments. TABLE 1G describes its fields:

TABLE 1G

PARTYTYPE TABLE 314

| FIELD | DESCRIPTION |
|---|---|
| *PartyTypeId | Identifies a party type |
| PartyType | Text label to describe a party type | a person known to the system 100. This includes both the public database 102 and user-specified people appearing in the private database 104. TABLE 1H describes its fields:

TABLE 1H

PERSON  
TABLE 316

| FIELD | DESCRIPTION |
|---|---|
| *PartyType | Identifies a party |
| Title | Title of the person, for example Mr., Mrs., Miss, etc. |
| Forename | A person's forename(s) |
| Prefix | The prefix of a surname for example, van, de, van der |
| Suffix | Suffix of a surname for example, II, Jr., Sr., III |
| Surname | A person's surname |
| Birthday | Birthday of the person |
| Age | Age of the person, calculated from the Birthday if known, otherwise sourced manually and updated by using the AgeUpdated field |
| AgeUpdated | Date on which the system increments the Age field, if Birthday is unknown |
| Envelope | Person's name and title as they should be printed on an envelope |
| Salutation | Person's name as it should appear in the introduction of a letter. This allows for personalizing of mailings, for example you might address someone as Mr Jones whereas your colleague might use Dear Bob |
| CountryCode | Identifies a country |

TABLE 1H-continued

PERSON  
TABLE 316

| FIELD | DESCRIPTION |
|---|---|
| HomeAddressId | FK to an Address table where home address string is stored |
| WorkAddressId | FK to an Address table where work address string is stored |

A PersonRelationship table 318 describes a particular relationship between two people. Such relationship may be, for example, a personal contact or a family relationship. TABLE 1I describes its fields:

TABLE 1I

PERSONRELATION  
TABLE 318

| FIELD | DESCRIPTION |
|---|---|
| *AccountabilityId | Identifies an accountability |
| ContactTypeId | Identifies a contact type |
| Private | Represents whether this personal contact data will be shared in an enterprise environment |

Relationship table 320 describes a relationship between an organization and a person. Examples of such relationships include employment and membership in a professional organization. TABLE 1J describes its fields:

TABLE 1J

RELATIONSHIP  
TABLE 320

| FIELD | DESCRIPTION |
|---|---|
| AccountabilityId | Identifies an accountability |
| Department | The name of the department for a organization/person relationship for example "Managing Board" |
| Role | The role the person is performing for the organization, for example "Manager" |
| SubRole | The subrole the person is playing (e.g., Manager of Finance) |

TABLES 1A–1J, in particularly tables 304 and 312, reflect the object-based design of the present invention. More specifically, the design of the tables is influenced by the party-accountability structure as a mechanism for organizing relationships h as described in M. Fowler, *Analysis Patterns: Reusable Object Models*, ISBN 0-201-896542-0, Addison-Wesley, 1997 (USA), which is incorporated herein by reference in its entirety.

Referring to FIG. 3, an Entity-Relationship diagram 300, according to an embodiment of CIDM system 100 is shown. FIG. 3, in describing the tables of TABLE 1A–1J, employs the "Chen notation" data modeling approach which is well-known in the relevant art(s), and was first described in P. P. Chen, *The Entity-relationship Model: Toward a Unified View of Data*, ACM Transactions on Database Systems 1:1 pp 9–36, 1976 (USA), which is incorporated herein by reference in its entirety. In Chen notation, symbols denote the minimum and maximum cardinality of the relationship of entities (i.e., tables) to one another, such as a zero or one, a one and only one, a zero one or many, or a one or many cardinality.

Because a relational database is employed for databases 102 and 104, in a preferred embodiment of the present invention, FIG. 3 identifies the fields for each table that are labeled primary keys. This is denoted by the symbol "PK,"

denotes a table field which is a primary key (i.e., the field or combination of fields that identify an entity uniquely) and the symbol "FK" denotes a table which is a foreign key (i.e., a reference from one record to another). Further, FIG. 3 depicts that the tables 301 are subtypes of the supertype Acc Type 302 table and that tables 303 are subtypes of the supertype Party Type 314 table.

As will be apparent to one skilled in the relevant art(s), the specific fields (and thus, tables) used within the CIDM system 100 may vary depending on the type (i.e., field of business) of the user(s) utilizing the system, the public database(s) available, the jurisdiction and culture where the system is employed, etc.

B. Private Contact Data Input

As mentioned above, the CIDM tool has access to one or more public databases 102. However, in order to provide the benefits and advantages of the present invention, as described herein, the CIDM tool must also have access to a database 104 containing the private contact information of the user(s) of the system 100. As will be described below, it is the access to both the public database 102 and private database 104 that allows the CIDM tool, among other features, to display a user's contact pathway.

In an embodiment of the present invention, the CIDM tool allows a user to directly input into the PC 106 their private contact information. Such input may be entered manually (i.e., entry by entry) in order to populate the database 104. Such manual entry would be utilized by users who currently hold their contact information in memory or in an non-electronic address book format. Such information would include, for example, person, organization, department, role (i.e., position), nationality, address, telephone numbers, etc.

In an alternate embodiment, the CIDM tool may accept private contact data from each user in a batch format. That is, the CIDM tool would allow the transfer of personal contact information from a user's electronic files. In one embodiment of the present invention, the CIDM tool may accept data input to populate the private database 104 directly from several of the commercially available contact manager software applications. Such applications include, for example, Microsoft® Outlook™ from the Microsoft Corporation of Redmond, Wash., Lotus® Organizer® from the Lotus Development Corporation of Cambridge, Mass., Symantec® ACT!® from Symantec, Inc. of Cupertino, Calif., GoldMine® from the GoldMine Software Corporation of Pacific Palisades, Calif., Maximizer from Multiactive Software, Inc. of Vancouver, British Columbia, Canada, and the like. Yet in another embodiment, the CIDM tool may provide a GUI push-button or radio button feature in each of the above named contact manager software applications in order to automatically start the batch export of private data into the CIDM tool.

In an embodiment of the present invention, as users enter their private contact information into the private database 104, these names are checked against the public database 102. For example, as a user enters (manually or via batch process) a contact "John Smith," the CIDM system 100 will search the public database(s) 102 for "John Smith." If a match is found, the CIDM system 100 will query the user via a GUI screen 108, whether, for example, their contact "John Smith" is the same "John Smith" who is on the board of the XYZ Company. This process allows, as described below, the user's contact pathway to be generated and displayed within the CIDM system 100.

In the enterprise versions of the CIDM tool, many users within the entity employing the CIDM system 100 may know the same "John Smith" who is on the board of XYZ Company. The CIDM system 100, however, will allow multiple copies of the "John Smith" record to exist in the public database 104, while linking each of those records to the one "John Smith" record in the public database 102. This may be achieved through the use of, for example, the PartyId, OrgPartyId, and OwnerId fields of the Party table 312. This allows each of the several enterprise users to hold their own personal information about "John Smith" (e.g., different contact numbers, different degrees of familiarity, etc.), while allowing an enterprise user to generate several, and locate the optimal contact pathway to John Smith via the records of PersonRelation table 318.

C. Safeguarding Data

In order to provide the benefits and advantages of the present invention, as described herein, public data must be provided by the contact intelligence service provider or other vendors of publicly available data. It is in conjunction with the private database 104, that all the advantages of the present invention mentioned above are fully achieved. Security concerns exists, however, with regard to the public database 102 and private database 104. That is, for maximum security, both these data stores—in terms of collection and/or storage—need to be safeguarded in several respects.

First, the private contact data entered into CIDM system 100 must be safe-guarded among the several users of the CIDM system 100 in the enterprise embodiments described above (e.g. with reference to FIG. 1C). When, for example, an employee enters their personal contact data into the system 100 (i.e., into private database 104), it may be desirable for fellow employees not to be able to access this data. Therefore, system 100, as described in detail below, must account for different levels of access when users employ the system 100 to browse and search contact pathways.

Second, the contact intelligence service provider (or other public data vendors which would provide database(s) 102) needs to be sensitive to the civil, privacy, and other legal rights of individuals who appear in these databases. As mentioned above, in an embodiment of the present invention the CIDM tool has access to a database 102 containing publicly available, multi-national information on the members of company boards of directors. This, by most (if not all) standards, is truly a "public" database 102. However, the contact intelligence service provider must be careful in some applications not to include certain information, or provide certain databases that may contain sensitive information, that although would aide in the task of determining contact pathways, would be considered an invasion of privacy (e.g., data on racial origin, religious affiliation, and the like).

In another example (or embodiment), although not as alarming to most as databases 104 containing data on racial origin, religious affiliation, etc., databases 102 and 104 may include data indicating family relationships among those individuals in the database. The familial relationships would thus serve as another criteria in yielding optimal contact pathways during the browsing and searching functions of the CIDM tool.

It is therefore sufficient to note that the contact intelligence service provider (or more generally, vendors who may market databases 102 for tools such as CIDM system 100) should consider and adhere to the laws and regulations (and possibly even the social norms/limits) of the jurisdiction(s) in which it operates and makes its different databases 102 available. Such legal considerations include, for example, the Council of Europe Convention for the Protection of Individuals with Regard to Automatic Processing of Data (1981), which has been ratified by at least 15 European nations, and the like.

D. Updating Data

In several of the above-described embodiments, an accurate database of public information (i.e., memberships on company boards of directors) can be provided by the contact intelligence service provider that would allow users to reliably merge,e their private contact data in order to ascertain their precise and up-to-date sphere of influence. The benefits and advantages of the present invention, as described herein, is provided when accurate public data is provided by the contact intelligence service provider or other vendors of publically available data. Such data can be consistently researched, periodically updated, and distributed to users of the CIDM system 100.

In the case of multi-national corporation board of directors information, conventional database systems and services have traditionally deleted and removed person's names from their databases as these persons become disassociated with a company board. This may be the case if a person resigns, retires, is not re-elected, etc. However, the design of the CIDM system 100, in one embodiment, recognizes that despite the fact that someone leaves a board of directors, does not necessarily imply that they no longer have access to that company. Accordingly, the CIDM system does not simply remove such persons from the public database 102, but stores the date of when such persons have ceased to be associated with the company. This is accomplished, for example, through the Start and Finish fields of the Accountability table 304. As will be appreciated by those skilled in the relevant art(s), this is one of several ways described herein that the present invention allows the generation of the optimal contact pathways.

V. Detailed Example of System Operation

In an enterprise embodiment of the present invention, the CIDM system 100 organizes information and can be explained in terms of four browsing modes and three searching modes as summarized in TABLE 2 and TABLE 3, respectively, below:

TABLE 2

| BROWSER MODE | FOLDERS |
| --- | --- |
| User's Contacts: | People |
|  | Organizations |
| Company Contacts: | People |
|  | Organizations |
|  | Employees |
| Contact Pathway: | User's Contact Pathway: |
|  | People |
|  | Organizations |
|  | Company: |
|  | People |
|  | Organizations |
|  | Employees |
| Public Information: | People |
|  | Organizations |

TABLE 3

| SEARCHING MODE | DESCRIPTION |
| --- | --- |
| People | String search of the database (102 and/or 104) for a particular individual |
| Organization | String search of the database (102 and/or 104) for an organization |
| Person at Organization | Search of the database (102 and/or 104) which reveals the contact pathway, if any, for a user to reach a targeted person at a specific organization |

It should be understood that the control flows shown in this section (i.e., FIGS. 25–27), which explain the browser and search modes of TABLE 2 and TABLE 3, respectively, are presented for example purposes only. The software architecture 200 (and thus, GUI screens 108) of the present invention is sufficiently flexible and configurable such that users may navigate through the system 100 in ways other than those shown in FIGS. 25–27. Furthermore, because it is well known in the relevant art(s), the GUI screens shown in FIGS. 4–24 are implemented using the Windows™ 95/98 tree hierarchy of expandable (+) and contracting (−) folders (and subfolders). Such implementation is also exemplary and not intended to limit the present invention.

Figure 24:
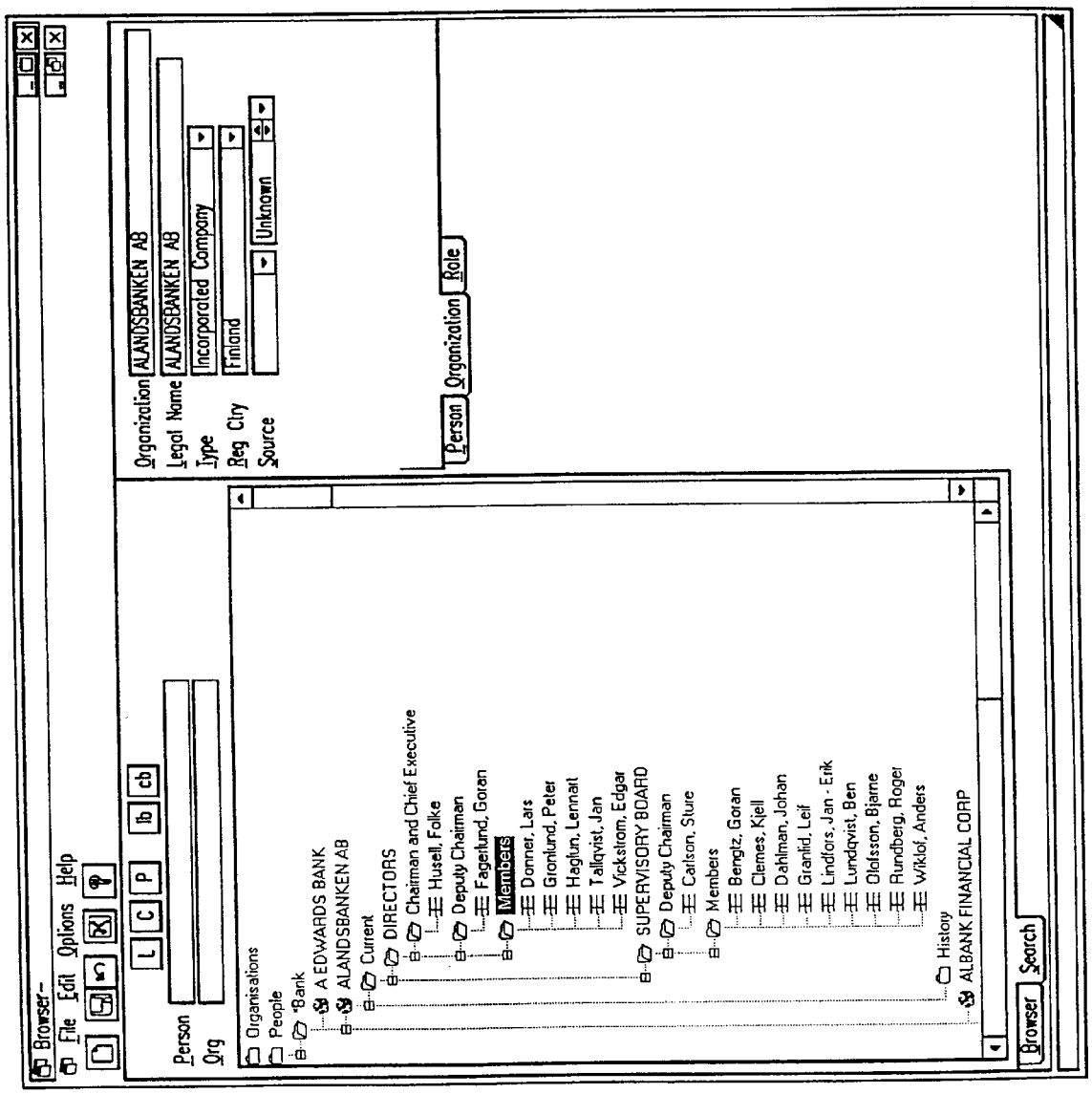
Figure 25A:
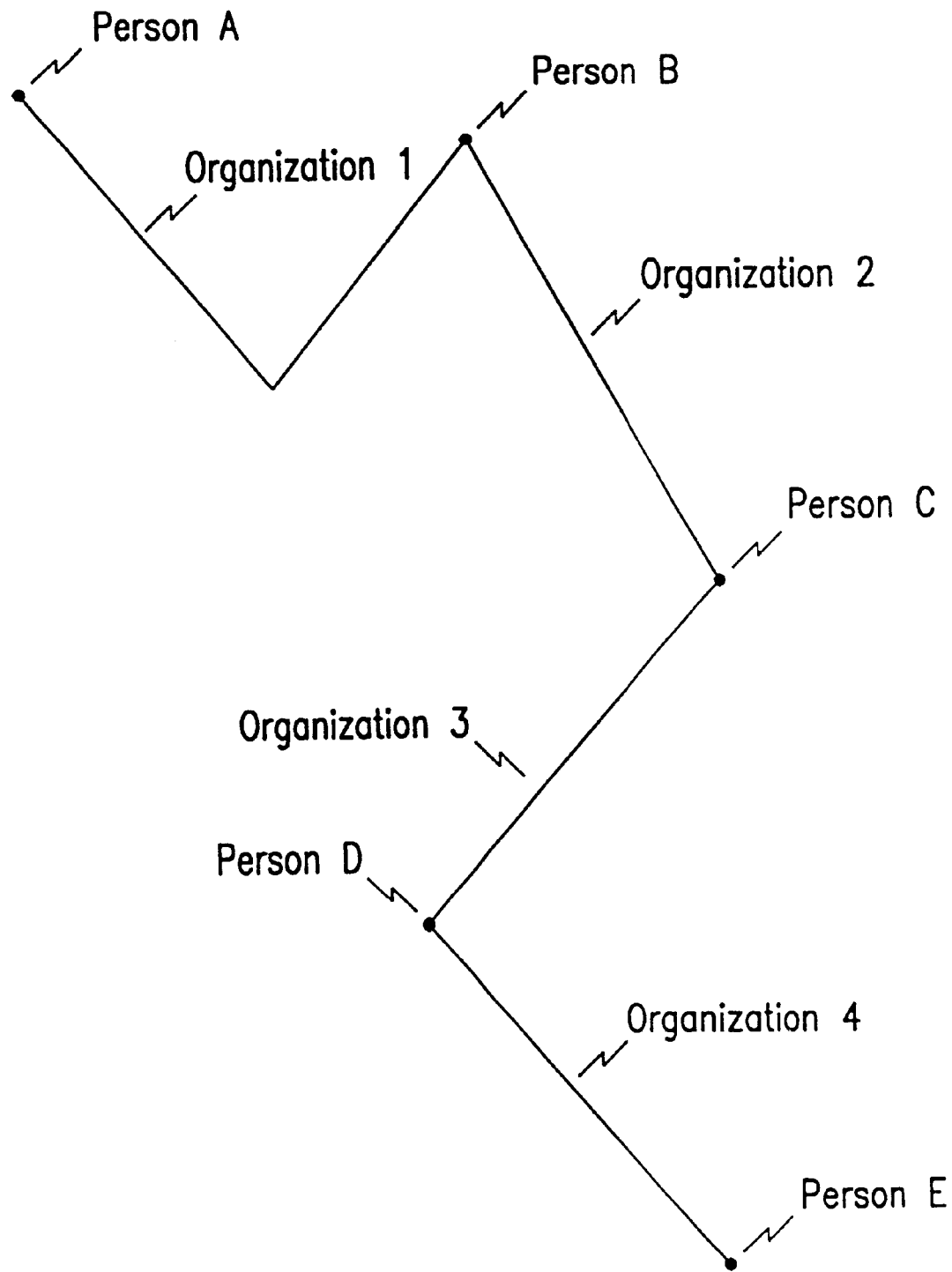
FIGS. 25A–B illustrate node diagrams that may be generated by the graphical user interface of the present invention to represent contact pathways.
Figure 25B:
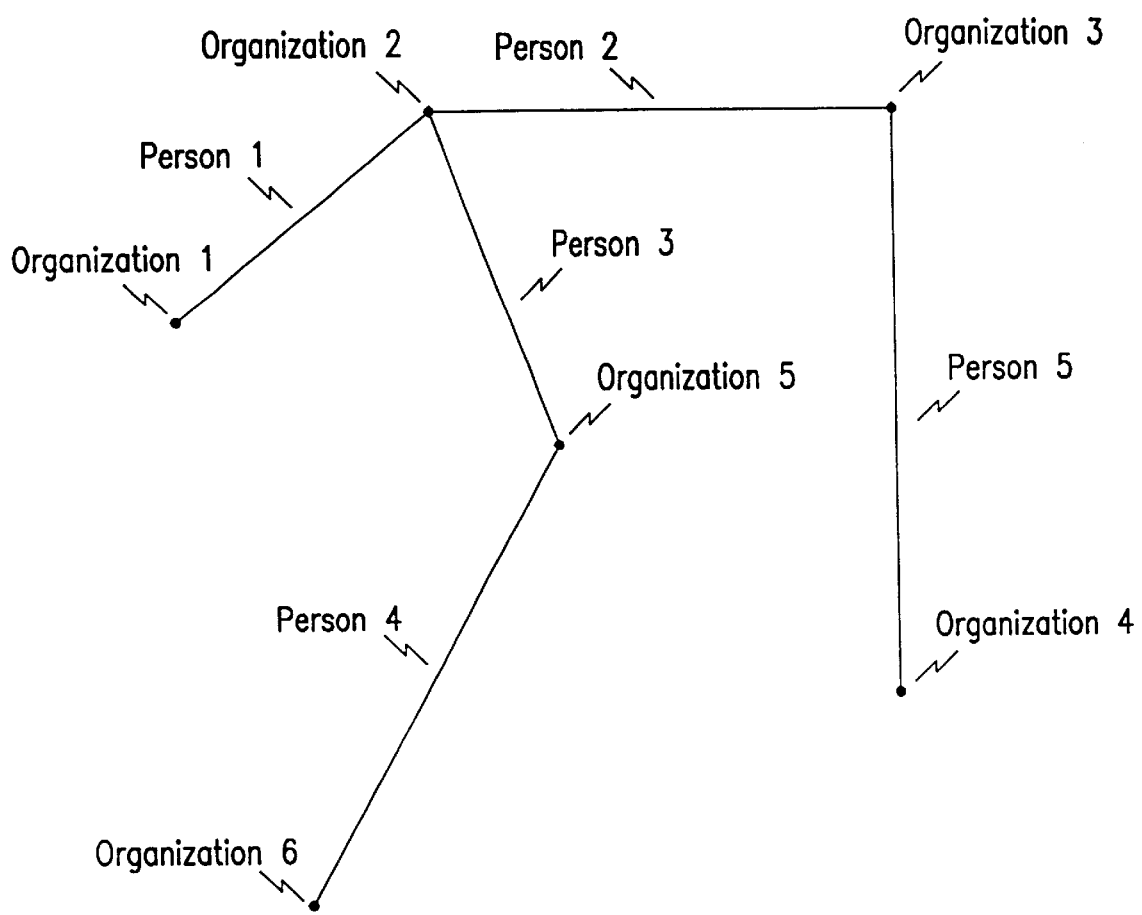

In an alternative embodiment of the present invention, the GUI screens 108, rather than appearing like those in FIGS. 4–24, may appear as shown in FIGS. 25A–B. Referring the FIG. 25A, a contact pathway may be displayed as a node diagram where the nodes denote people and the links denote organizations that form the associations between the nodes (i.e., people). Alternatively, referring to FIG. 25B, a contact pathway may be displayed as a node diagram where the nodes denote organizations and the links denote the people that form the associations between the nodes (i.e., organizations).

It also should be understood that the control flows shown in this section, utilize a public database 104 which contains publicly available information on the boards of directors of multi-national corporations. This public database 104 is presented only for example purposes and ease of explanation. As mentioned above, the CIDM system 100, in alternative embodiments, may utilize public information database(s) 102, singly or jointly, containing data on university alumni clubs, political party organizations, trade groups, social clubs, military branches, members of a legislature, and the like.

In an alternative embodiment, the public database may include quasi-public information (i.e., the membership list of an exclusive club), which the user(s), who are legally in possession of such information, may combine with a (true) public database 102 (e.g., boards of directors) in using the present invention. Alternatively, the contact intelligence data management service provider may allow enterprise users to build quasi-public database(s) 102 which only the members of the enterprise may have access to upon accessing the WWW 120 hosting the service.

Figure 26:
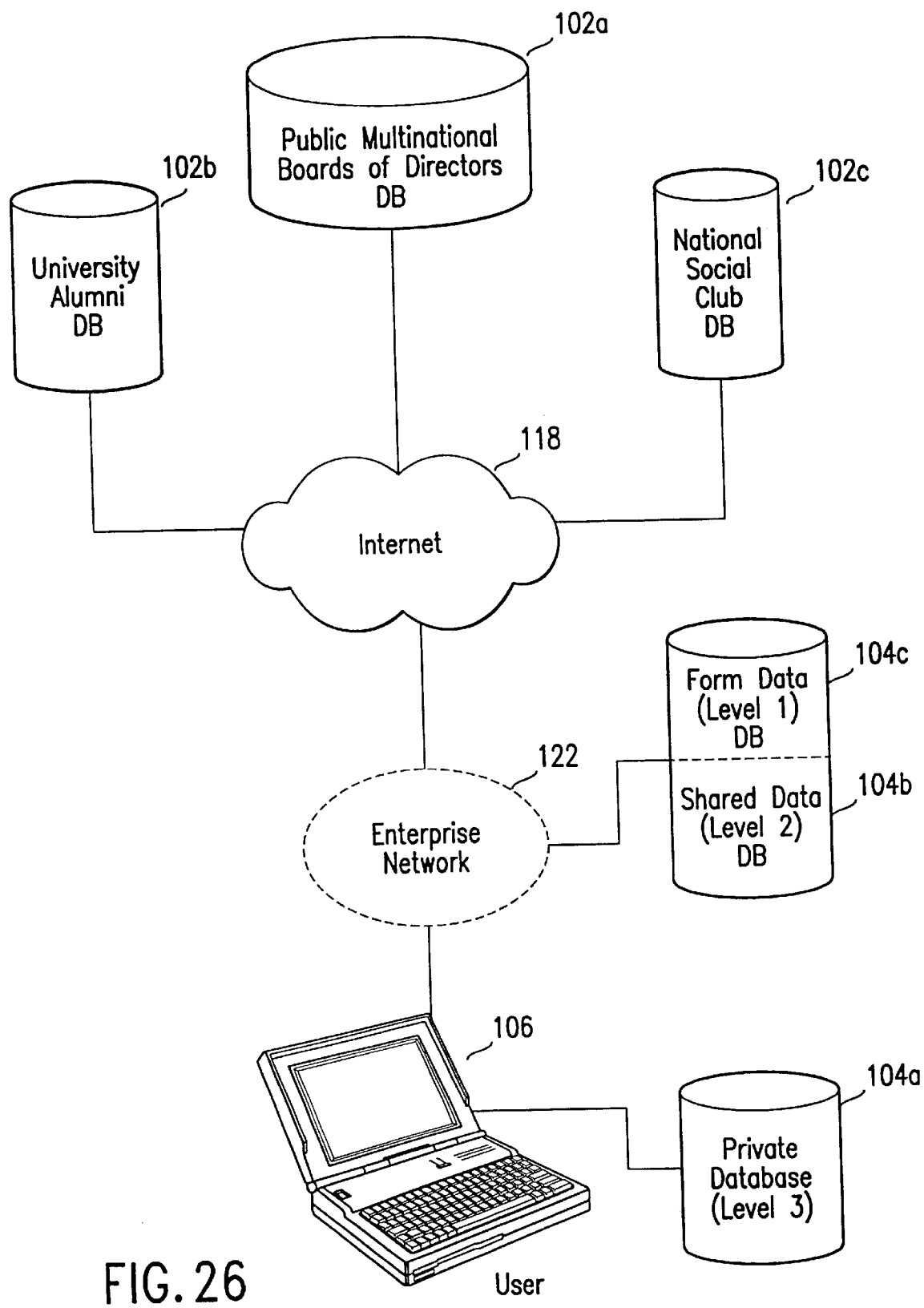
FIG. 26 is a block diagram illustrating the system architecture of an enterprise embodiment of the present invention, showing connectivity among the various components.

In yet another embodiment, a stand-alone or enterprise user may have access to several public databases 102 which include true public data and quasi-public data. Referring to FIG. 26, a block diagram illustrating the physical architecture of a CIDM system 100 is shown. The enterprise user, as an employee of the enterprise and using their PC or workstation 106, has access to the enterprise-wide (quasi) private databases 104b and 104c. The quasi-private database 104b includes the private contact information (first level) data shared by the several users of the enterprise, while the private database 104c contains the form (second level) data collected by the enterprise. The user also has access to their own (top level three) secret private database 102 while using the CIDM tool over the Internet 118, via the enterprise network LAN or WAN 122.

The CIDM provider can also provide the enterprise users with several quasi-public databases 102. As shown in FIG. 26, the CIDM provider can not only allow access to the multi-national boards of directors data in public database 102a, but also provide public databases 102b and 102c. These databases, in an embodiment of the present invention, can represent, for example, a university's alumni database 102b, and a private social club database 102c. Thus, if the enterprise user were also an alumni of the university and/or a member of the national social club, these databases can be accessed and used to display broader spheres of influence—contact pathways. The public databases 102b and 102c can be provided to the CIDM service provider on a license basis where the owners of such data (i.e., the university and the private social club, respectively) excise a license fee for every "hit" (i.e., every time the data within the database is accessed).

As will be apparent to one skilled in the relevant art(s), the stand alone embodiments of the present invention may also realize the database 102 and 104 access scheme presented in FIG. 26.

A. Browser Modes

The CIDM system 100 browser, after population of the databases 102 and 104, in an embodiment of the present invention, organizes information into four exemplary modes—User's Contacts, Company Contacts, Contact Pathways, and Public Information.

Figure 4:
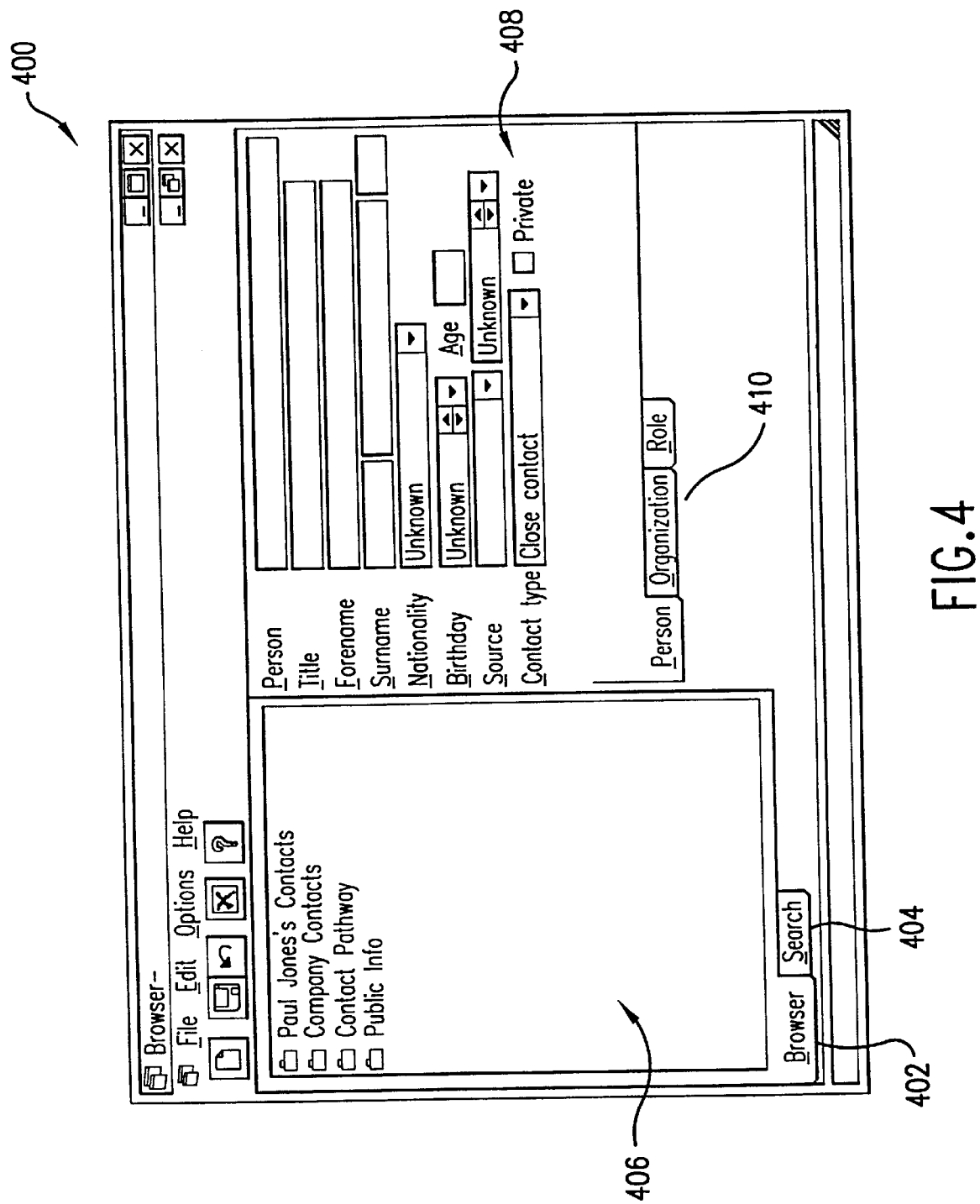
FIGS. 4–24 are windows or screen shots generated by the graphical user interface of the present invention.

Referring to FIG. 4, a user Paul Jones' CIDM system 100 browser screen 400 is shown. Screen 400 includes two buttons to toggle from the four browser modes of TABLE 2 and the three search modes of TABLE 3. A browser button 402 toggles the CIDM system 100 into the four browser modes and a button 404 toggles the CIDM system 100 into the three search modes. Screen 400 is separated into two regions—a tree display region 406 and a information field display regions 408. The region 406 allows a user to navigate through the folders and subfolders of the different browser modes as explained in detail below. The region 408 displays the applicable information fields present in the public database(s) 102 and private database(s) 104 in response to the user's navigation through the region 406. The display of region 408 is also responsive to three toggle buttons 410—Person, Organization, and Role—which display the applicable fields from the databases 102 and 104.

1. User's Contacts

The "User's Contacts" (or the "My Contacts") mode allows an individual employee in a company (or a single user in a stand-alone embodiment), using the system 100 to keep track of their contacts—both in terms of people and the organizations those contacts represent.

As mentioned above, in a preferred embodiment of the present invention, the databases 102 and 104 may reside on the same physical media and separated as two virtual databases. Titus, the private database 104 as well as the public database 102 may share a similar structure (i.e., have common fields) within a relational database.

Thus when entering a contact, the user is provided with a link to the public information available in the public database 102. This allows the user to enter proprietary information about their contacts (e.g., clients) as in a standard contact manager software application, except for the fact that in the system 100, a user is now able to also see any public information on the entered individual contact that is available within the public database 102.

The information the user enters is stored "locally" and is kept proprietary to the user. It is not shared (i.e., copied into) the public database 102 (or provided to the contact intelligence service provider). In addition, the public information available for the user's entered contact is then used to establish potential relationship paths between the contact and individuals in the international corporate world that the user presently does not know.

The "User's Contacts" browsing mode is divided into two information viewing folders—"People" and "Organizations." That is, under the folder "My Contacts" are the folders "People" and "Organizations." When the "People" folder is expanded it shows that the current user has contacts who reside in Switzerland and the United Kingdom. When the folder "United Kingdom" is opened, the display reveals that the user has contacts in that country whose surnames begin, in this case, with the letter F.

Figure 5:
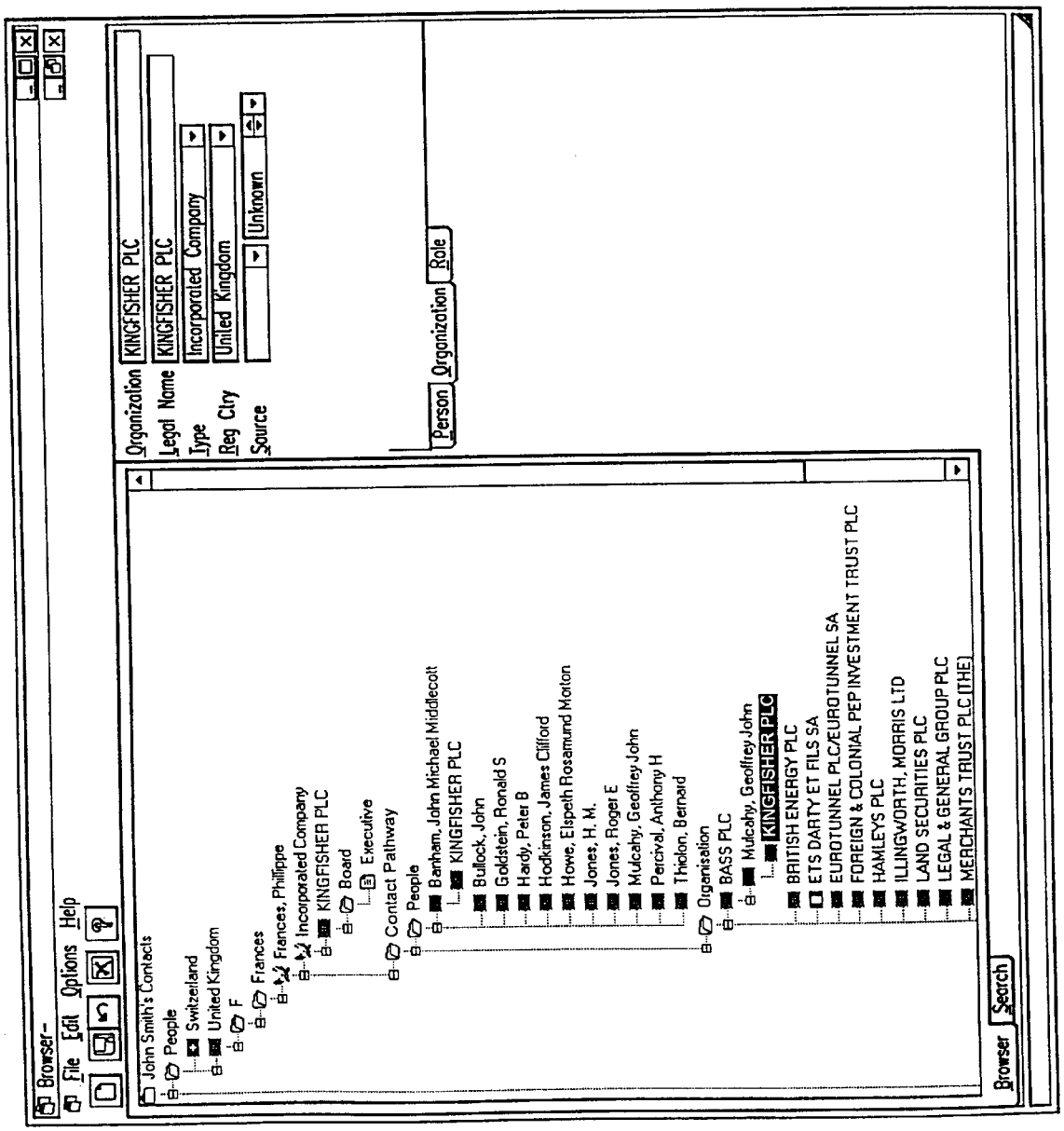

Referring to FIG. 5, if the user clicks on Philippe Frances the user can then see that he has a Board position in a commercial organization named KINGFISHER PLC. The folder "Contact Pathway" is divided into two sections, "People" and "Organizations." Under the folder "People" is a list of people Mr. Frances has direct access to. If the user clicks on one of these contacts, the relationship path by which he has this access is shown. In this example, he has direct access to J. M. M. Banham through KINGFISHER PLC. Similarly John Smith, has indirect access to J. M. M. Banham through Philippe Frances.

Figure 6:
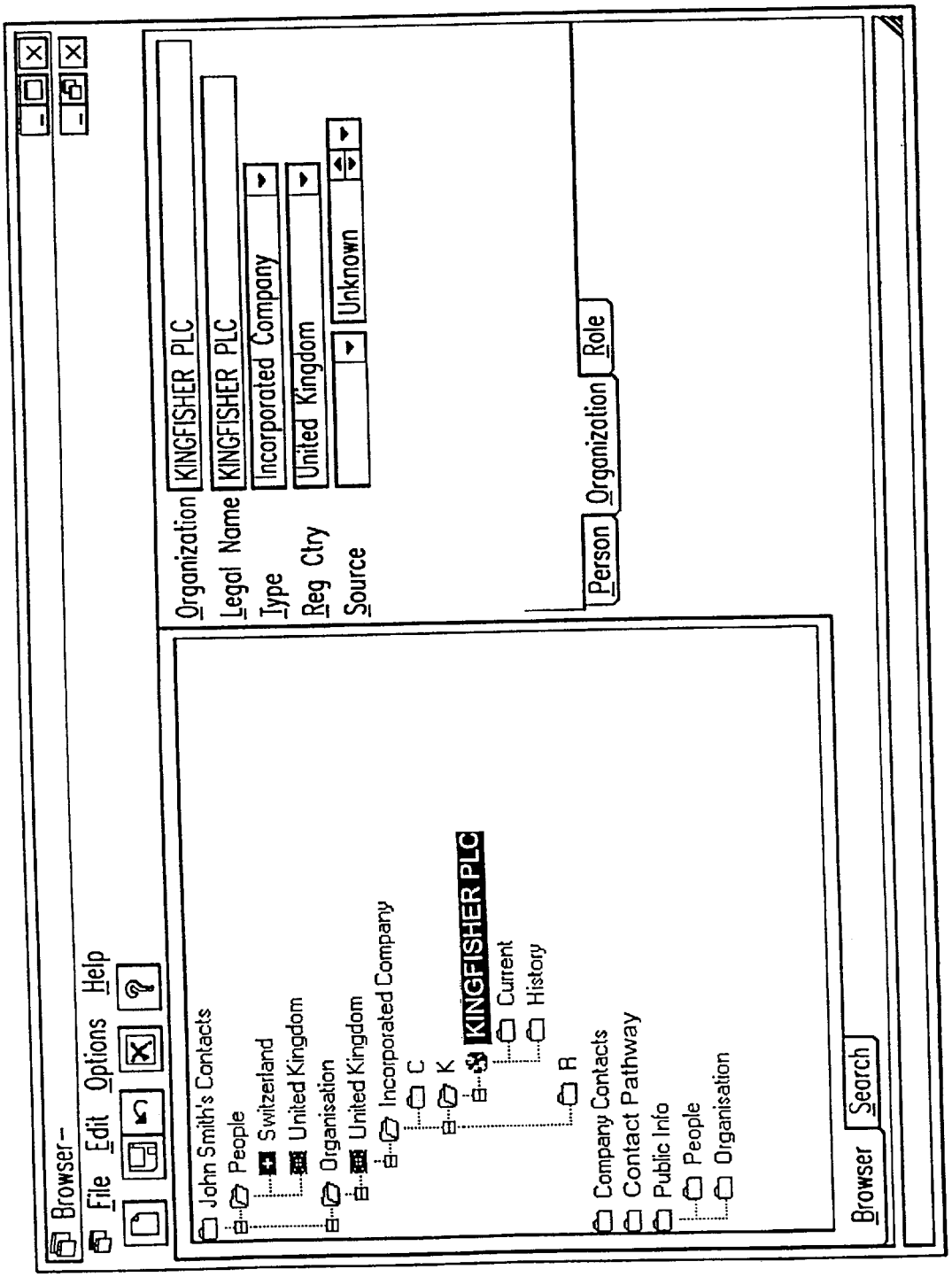

Under the folder "Organizations," a list of organizations that Smith has indirect access to, in the same way as with people, is shown in FIG. 6. If the user clicks on one of them, the information on how he has this access appears. In this example, he has indirect access to BASS PLC through Geoffrey Mulcahy who shares a Board position with Philippe Frances on KINGFISHER PLC.

Under the folder "My Contacts," the user also have available the folder Organizations which is open in this example showing me that the user have contacts with Incorporated Company organizations in the United Kingdom. Incorporated Company is the type of organization, other types could be Social, Educational, etc. If the user opens the folder "Incorporated Company" the user will then see the names of the organizations which begin with the letters C, K and R.

In an embodiment of the present invention, where the public database 102 includes multi-national corporation board of directors information, the GUI screens 108 will display in region 406 a flag corresponding to the national origin of the entity being browsed as shown in the (applicable) screen shots of FIGS. 5–24.

2. Company Contacts

The "Company Contacts" mode allows a user, who is manager at the company utilizing an enterprise embodiment of the present invention, to keep track of any particular employee's contacts and the contacts of the company as a whole. These contacts, like the "User's Contacts" mode, include individual people as well as the organizations they represent.

Figure 7:
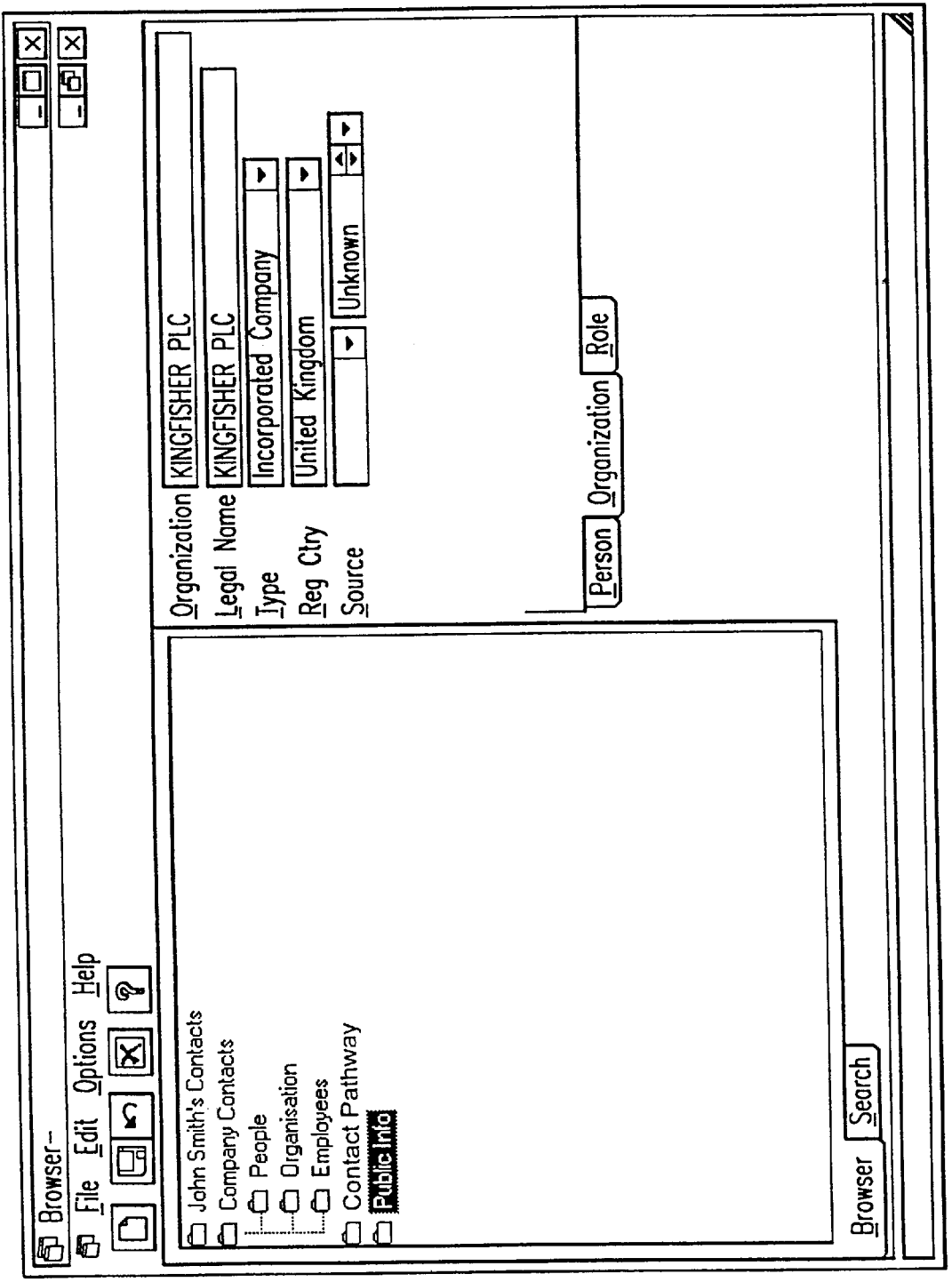

The "Company Contacts" browsing mode is divided into three information viewing folders—People, Organizations, and Employees. That is, under the folder "Company Contacts" are the folders "People," "Organizations," and "Employees" as shown in FIG. 7.

Figure 8:
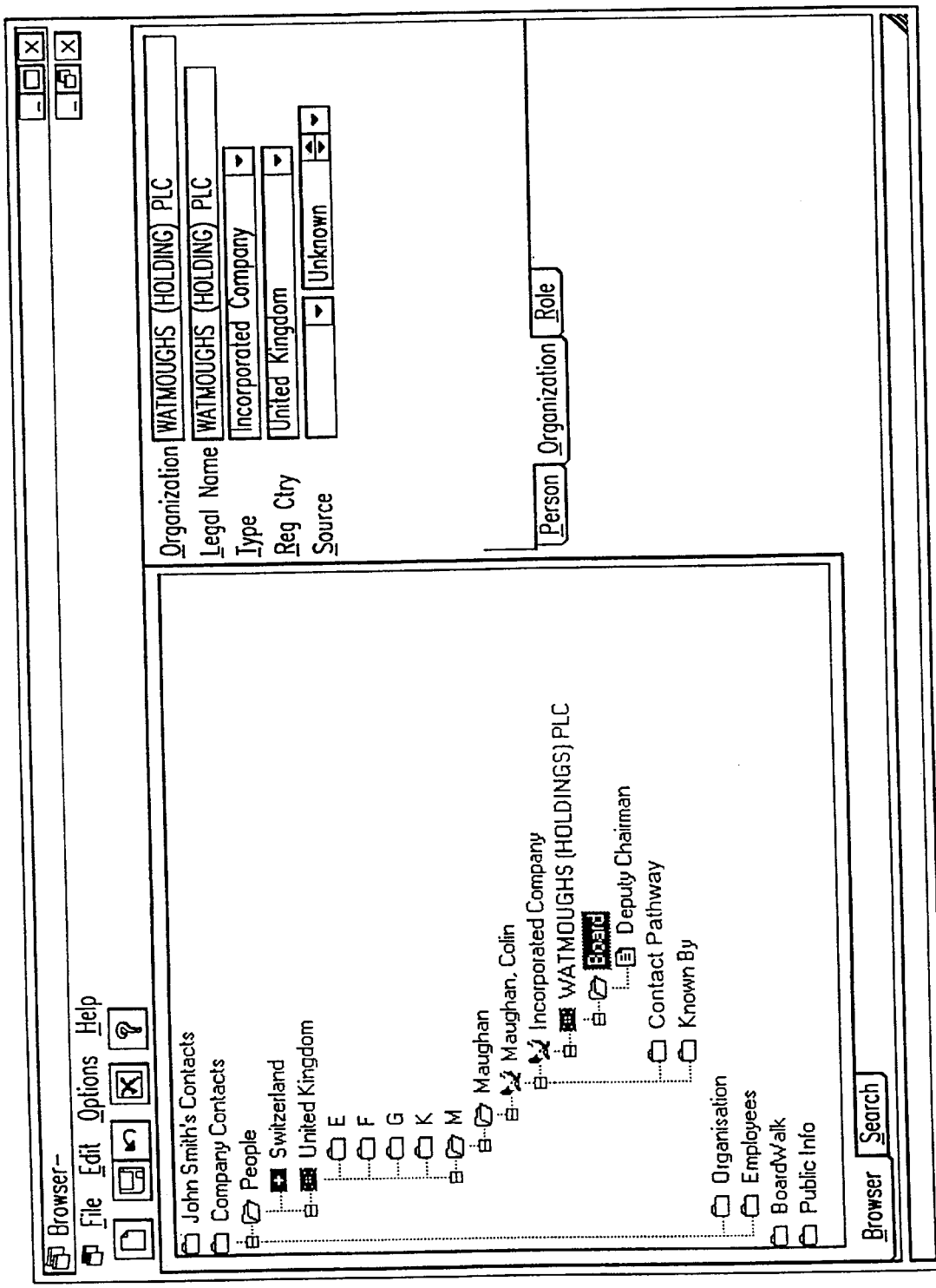

First, referring to FIG. 8, under the folder "People" the user can see that they have contacts in Switzerland and the United Kingdom. Upon opening the folder "United Kingdom" they user will see that they have contacts whose surnames begin with the letter E, F, G, K and M.

Now the user has two folders that can be opened, the folder "Known by," and the folder "Contact Pathway." The folder "Known By" tells the user which employee(s) of the company know Colin Maughan. The folder "Contact Pathway" shows the user Colin Maughan's Contact Pathway (i.e., all the people and organizations he knows directly). Colin's Contact Pathway tells the user the people they know indirectly through Colin.

Figure 9:
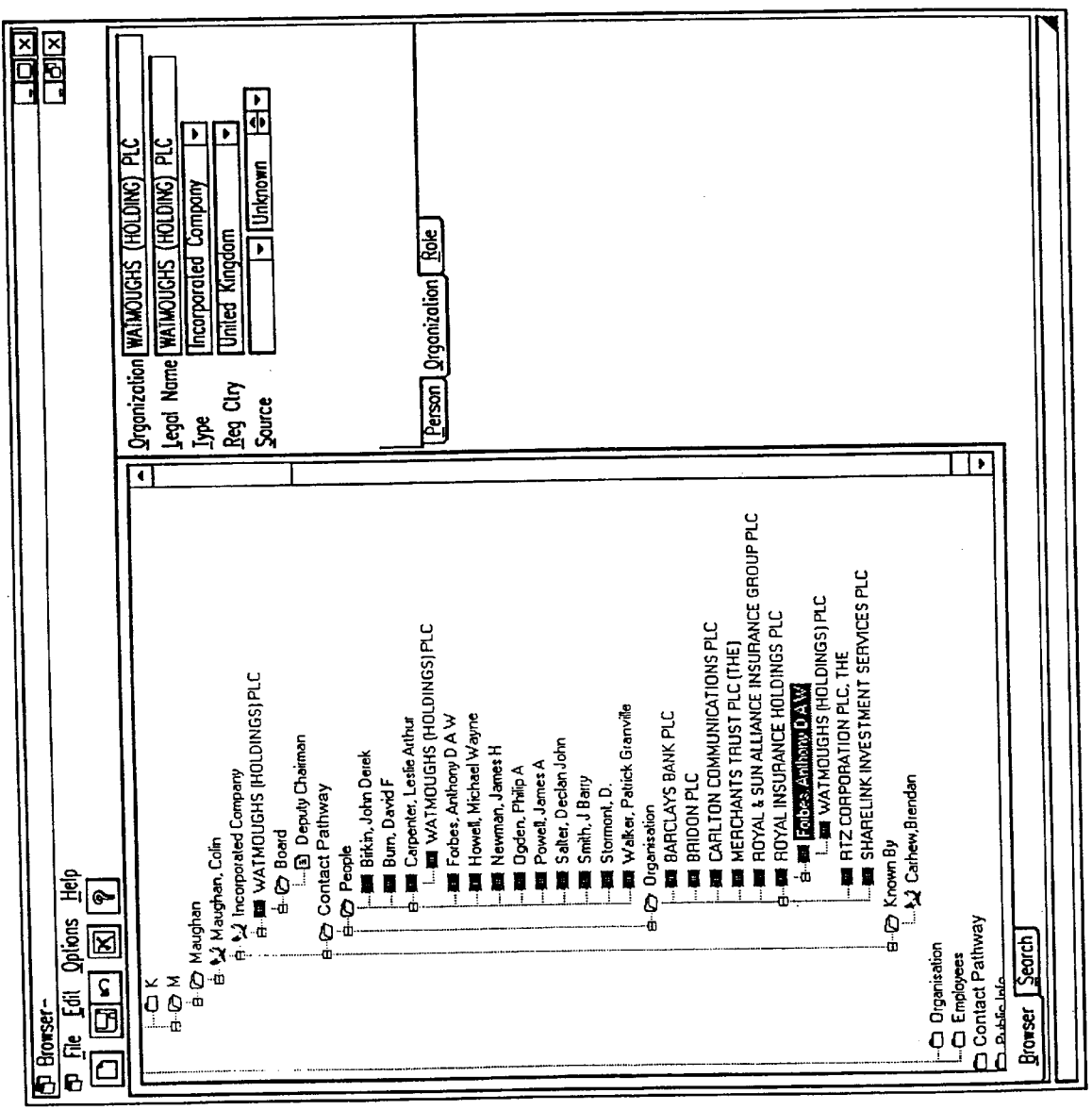

In the example of FIG. 9, Brendan Carhew has indirect access to Leslie Carpenter through Watmoughs Holdings PLC. He also has access to Royal Insurance Holdings PLC through Antony Forbes because of his Board position in Watmoughs Holdings PLC.

Figure 10:
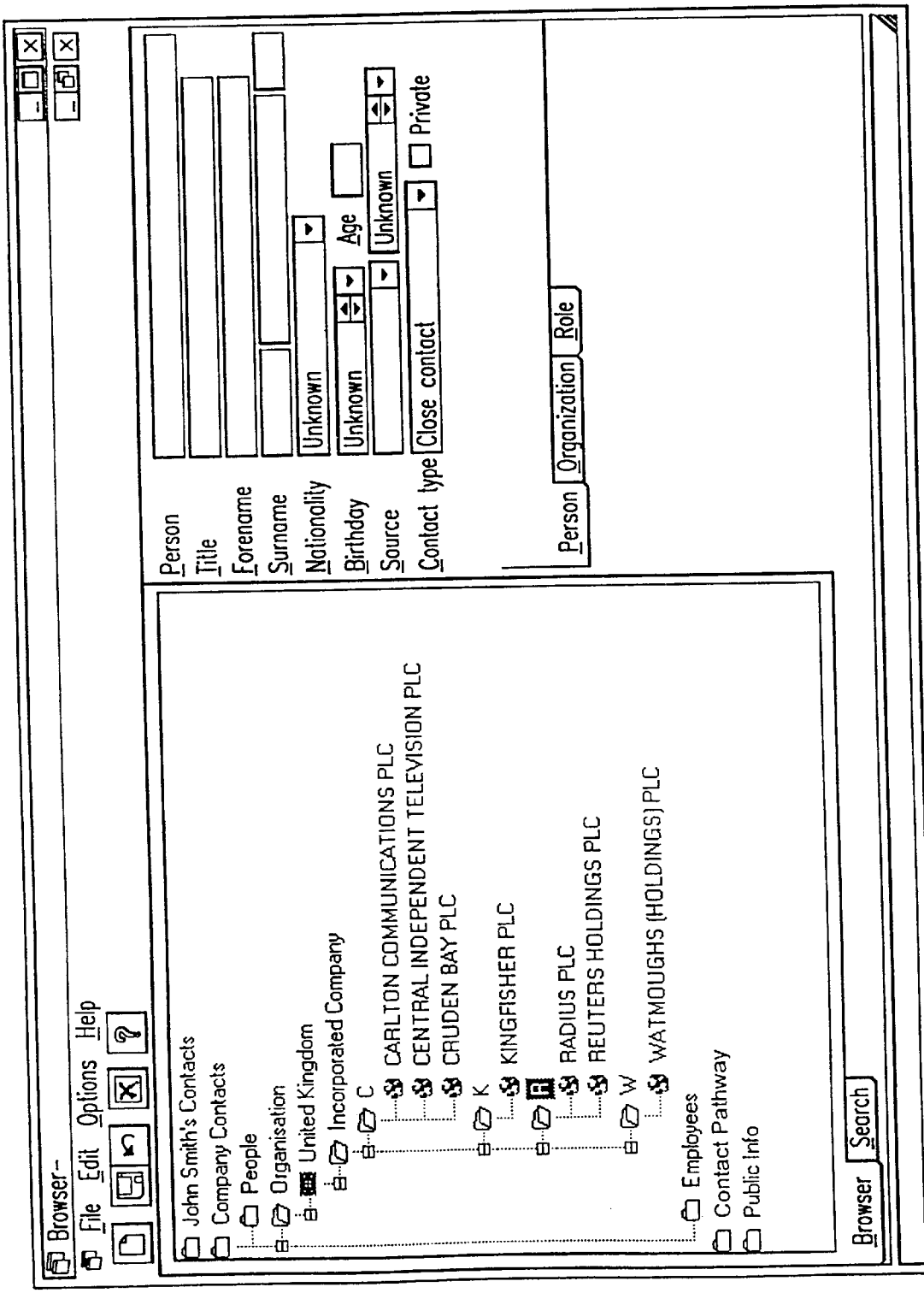

Second, referring to FIG. 10, under the folder "Company Contacts" the user has available the folder "Organizations." In the example, this folder is open and shows that the user has contacts with commercial organizations in the United Kingdom whose names begin with letters C, K, R and W.

Figure 11:
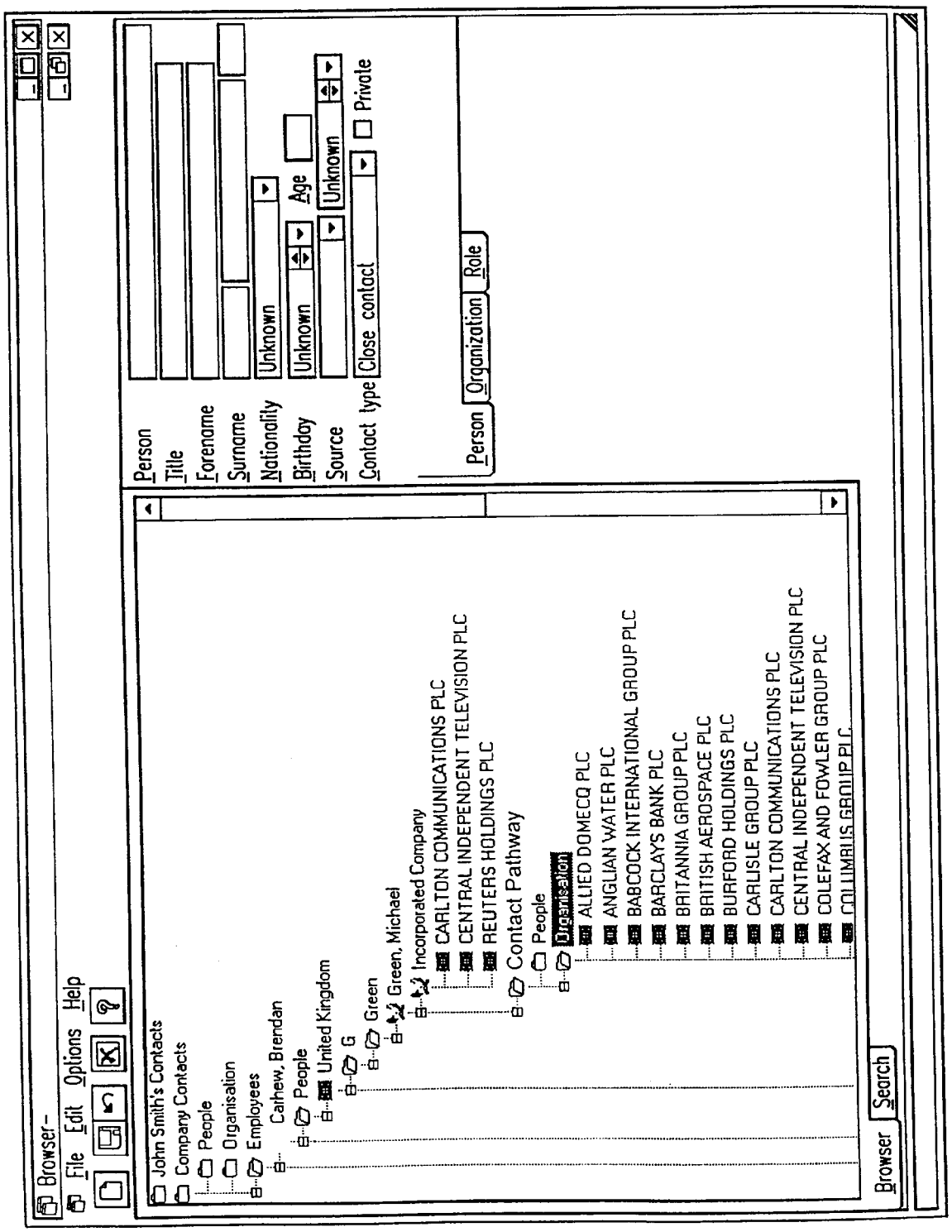

Third, referring to FIG. 11, under the folder "Company Contacts" the user has available the folder "Employees" where a list appears of the employees the user manages. By clicking, for example, on Brendan Carhew, the user can see that he has contacts with people in the United Kingdom. By opening the folder "United Kingdom" the user sees that he has contacts with people whose surnames begin with letter G.

In an embodiment of the present invention, the enterprise versions of the CIDM system 100 will only allow certain (i.e., managerial) users of the system to browse in the "Company Contacts" mode. That is, security measures are implemented to safe-guard the private database 104, so that only certain users may view other user's personal contact information. In one example, if a large multinational bank employed an enterprise version of the CIDM system 100, the manager of the finance department may be able to access the personal contact information of all the employees in the bank's finance department. However, that same manager would not be able to access the personal contact information of the bank's employees who work in the trading department—the manager of the trading department would, however, have access to this information. In an embodiment of the present invention, the entity employing the CIDM system 100 would decide (e.g., via their management information systems (MIS) department) which personnel would be deemed to have access to which employees based on a departmental or any other logical scheme. In such an embodiment, the CIDM system 100 may mirror the existing security features of that the entity's local or wide area network (e.g., user login, passwords, access groups, access levels, access rights, etc.) currently employs. The access levels, for example, may then be enforced within the CIDM system 100 by using the OwnershipId, CommisionerId, and ResponsibleID fields within the Accountability table 304.

In another embodiment of the present invention, department managers, while having access to their employees private contact information for purposes of browsing "Company Contacts" mode, may on be given access to certain fields within the tables of the private database 104. That is, the managers may be given access to the fields (e.g., ContactLevel in the ContactType table 306) relevant to browsing and displaying contact pathways, but may not be given access to more "sensitive" fields (e.g., the Notes Field in the Party table 302, the Salutation field in Person table 316, etc.) which employees would not want their managers viewing.

3. Contact Pathway

Figure 12:
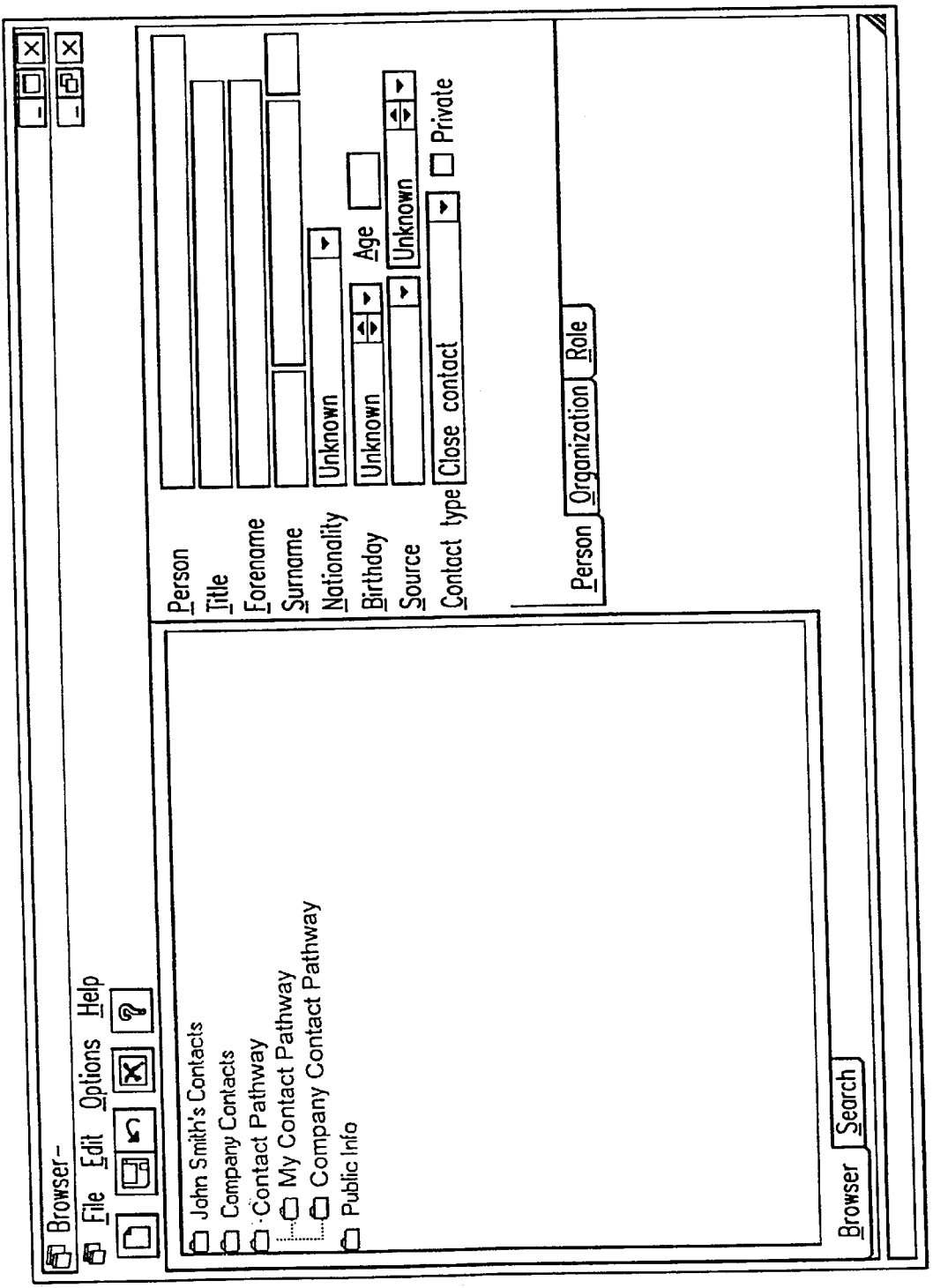

The "Contact Pathway" mode allows a user or employee to generate an electronic Contact Pathway both in terms of people they have indirect access to, as well as organizations. This mode also allows a user, who is a company manager, to generate a Contact Pathway for the company as a whole. The "Contact Pathway" browsing mode is divided into two information viewing folders—User's Contact Pathway and the Organization's Contact Pathway. That is, under the folder "Contact Pathway" are the folders "My Contact Pathway" and the "Company Contact Pathway" as shown in FIG. 12.

Figure 13:
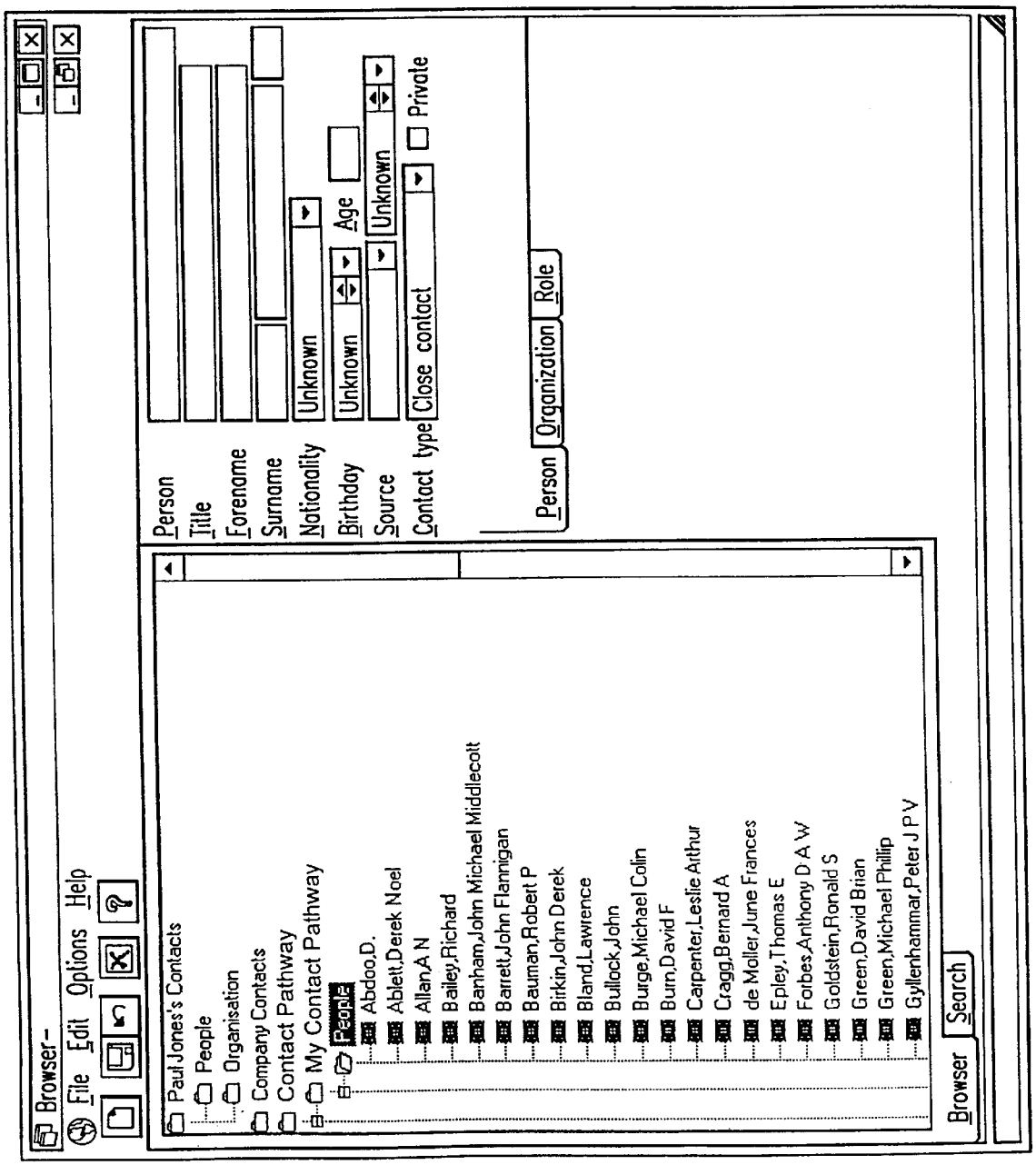
Figure 14:
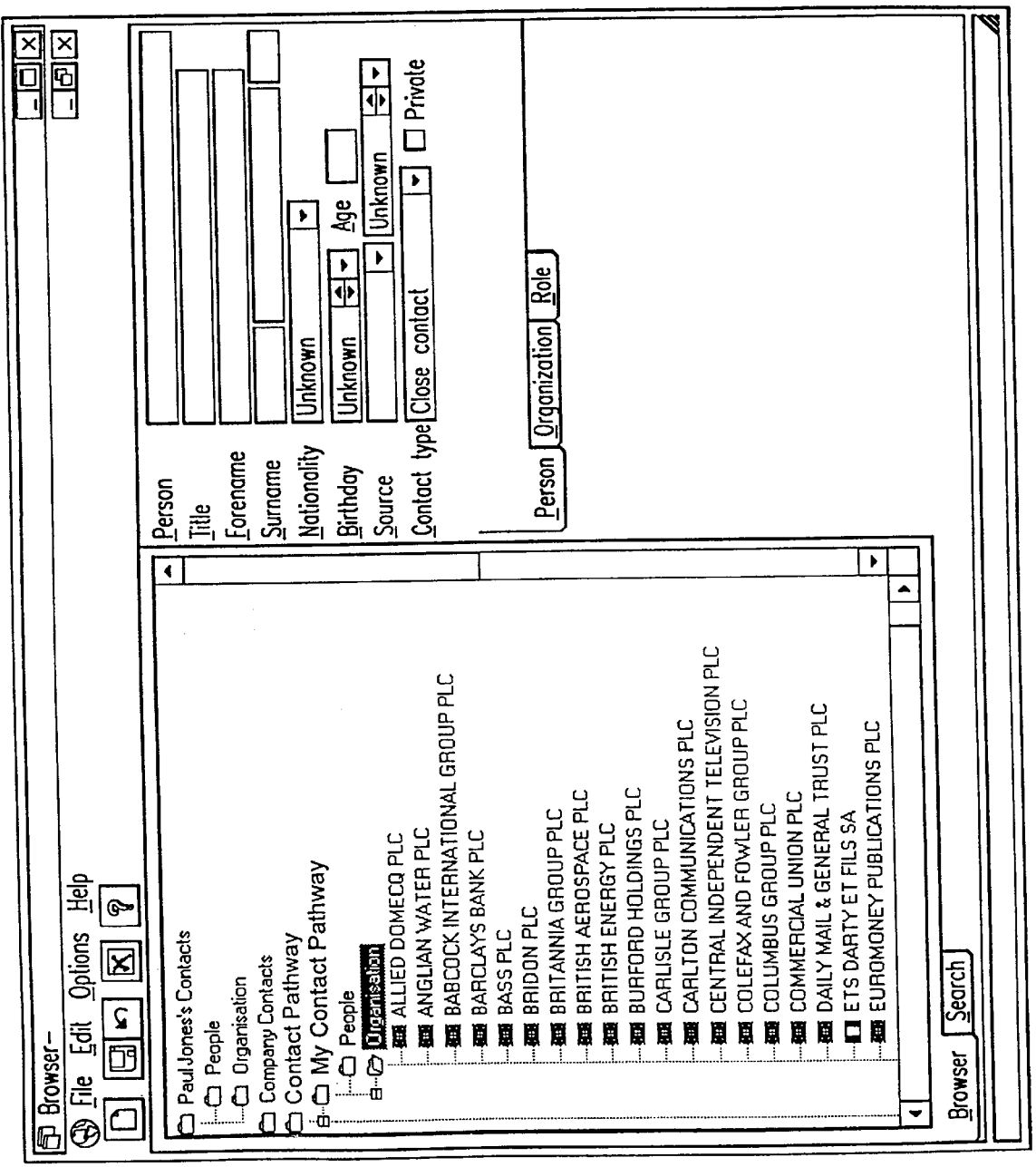

When the user opens the "My Contact Pathway" folder, two subfolders are revealed—a "People" folder and an "Organization" folder. Opening the "People" subfolder reveals a list of all the individuals which the user has indirect access to as shown in FIG. 13. Similarly, opening the "Organization" subfolder reveals the all the companies that the user has indirect access to as shown in FIG. 14.

When the user opens the "Company Contact Pathway" folder, three subfolders are revealed—a "People" folder, an "Organizations" folder, and an "Employees" folder.

Figure 15:
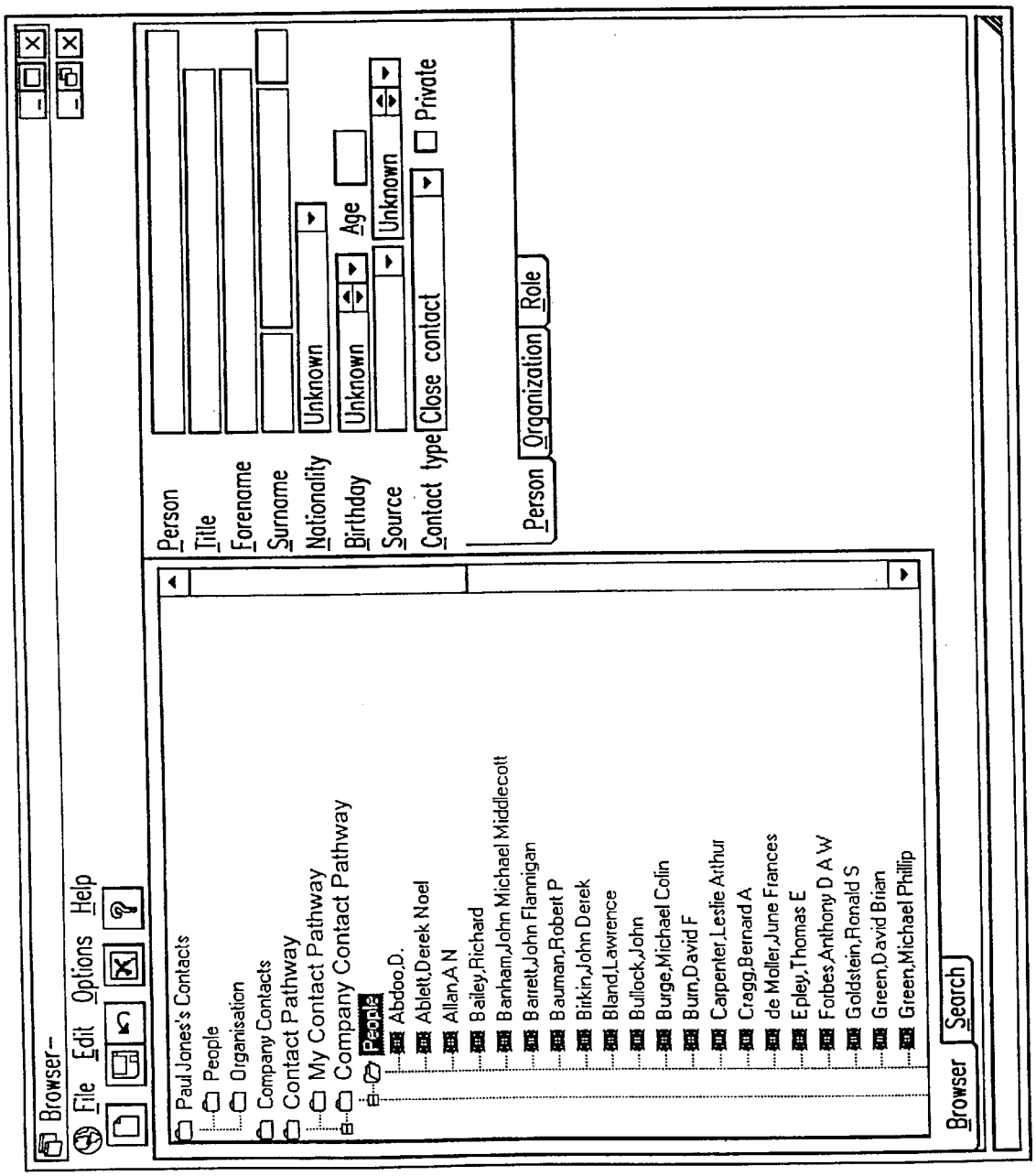
Figure 16:
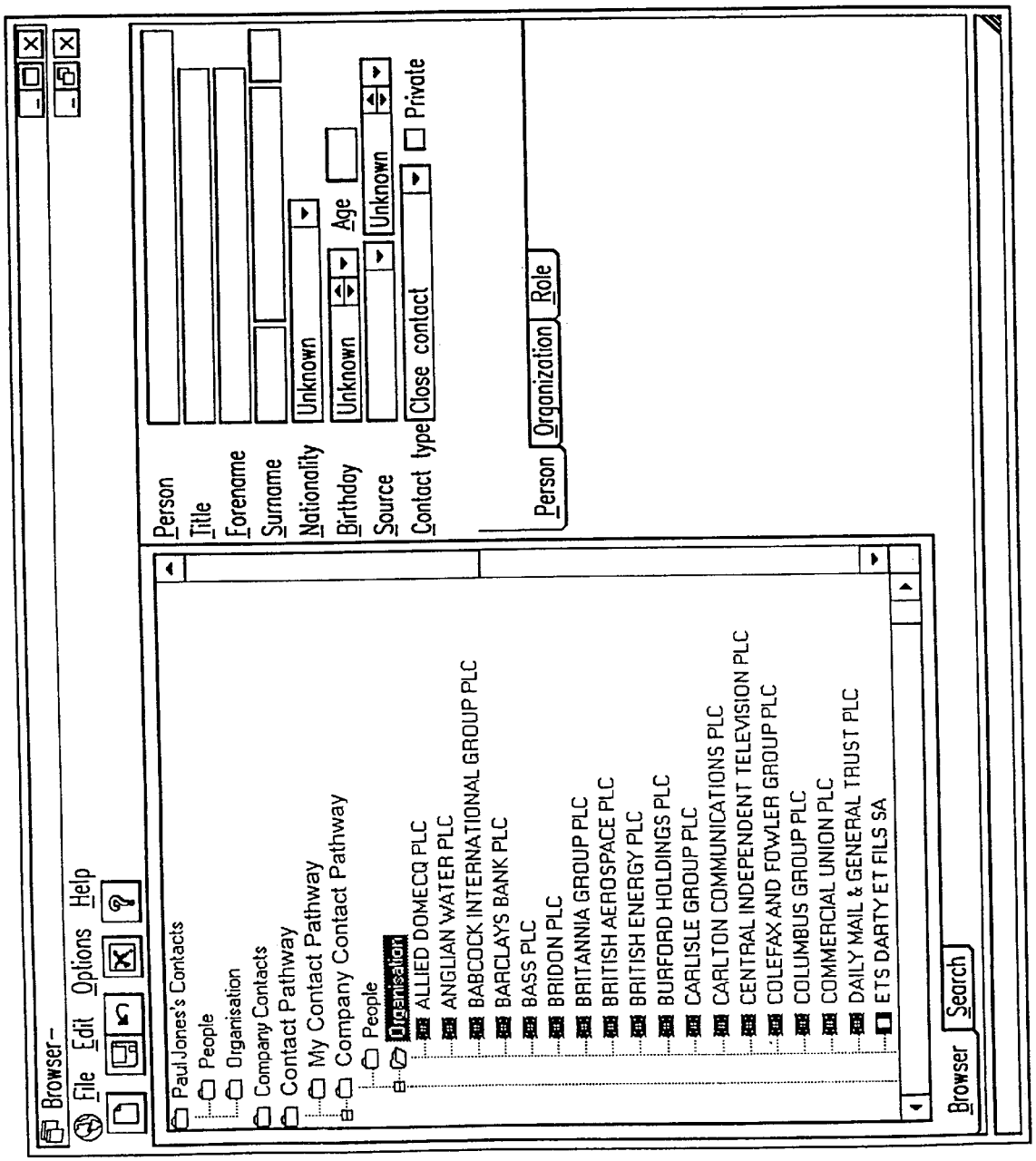
Figure 17:
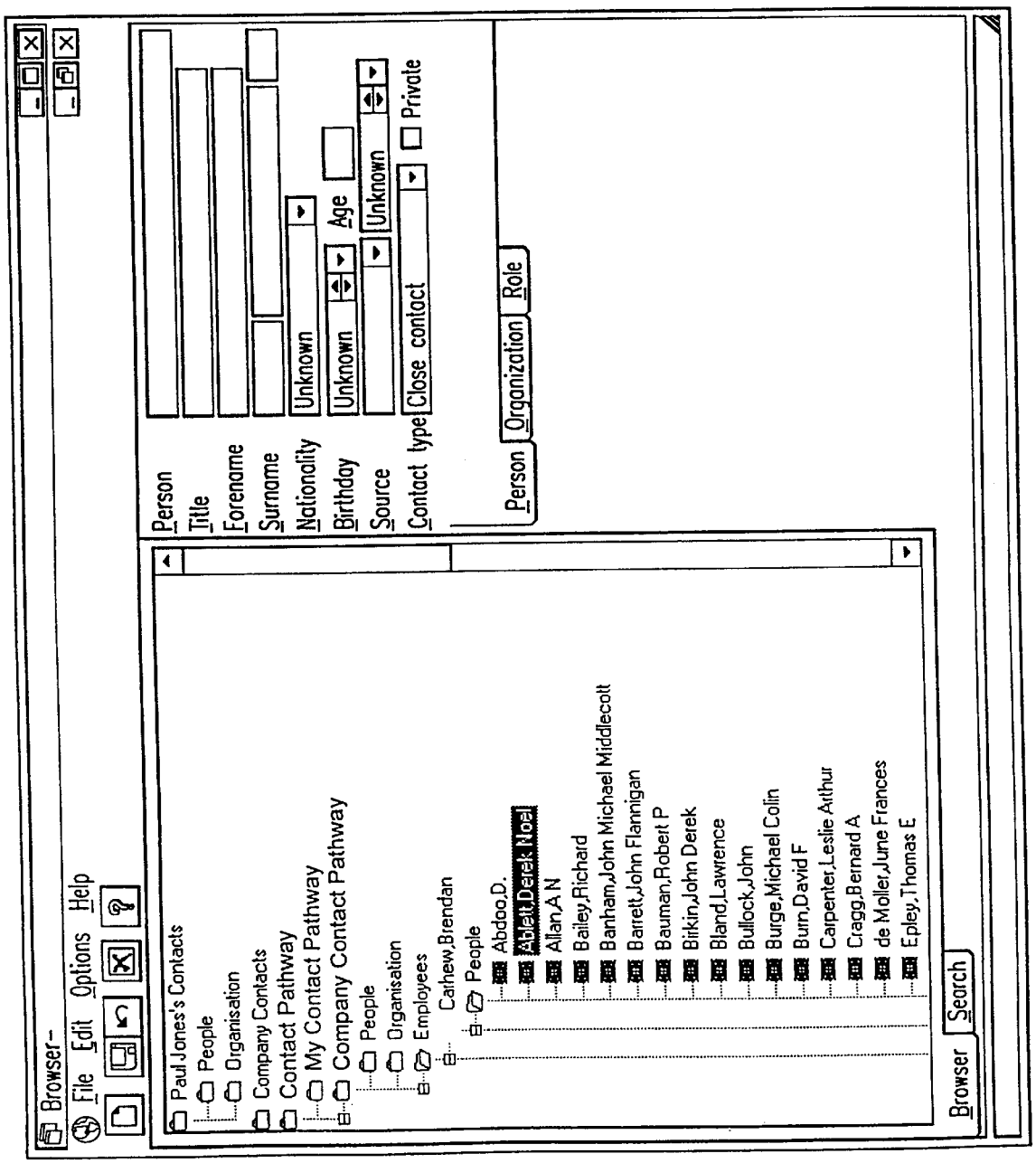

Opening the "People" subfolder reveals a list of all the individuals which the user has indirect access to through the fellow employees of company as shown in FIG. 15. Similarly, opening the "Organizations" subfolder reveals the a list of all the companies that the user has indirect access to through fellow employees of company as shown in FIG. 16. And opening the "Employees" subfolder shows all the Contact Pathways of the employees organized by people and by organization as shown in FIG. 17. This gives the user a view of all the people and organizations to which the company can have an indirect access to. In this case the user can see the people and organizations to which the company has indirect access through Brendan Carhew who is one of the employees of the company.

4. Public Information

The "Public Information" mode, unlike the previous three modes which browsed information in both the public and private databases, allows a user (employee or manager) to scan solely the public information within public database 102 for reference purposes. By browsing the public database 102 for both people and organizations, the user is able to see the direct corporate involvement of an individual as well as an organization's list of individuals involved. In an embodiment of the present invention, the user is able to generate a Contact Pathway for any individual in the public database 102 regardless of the individual is an actual contact of the user. This allows the user to determine their potential sphere of influence should they meet an specific individual not presently known.

Figure 18:
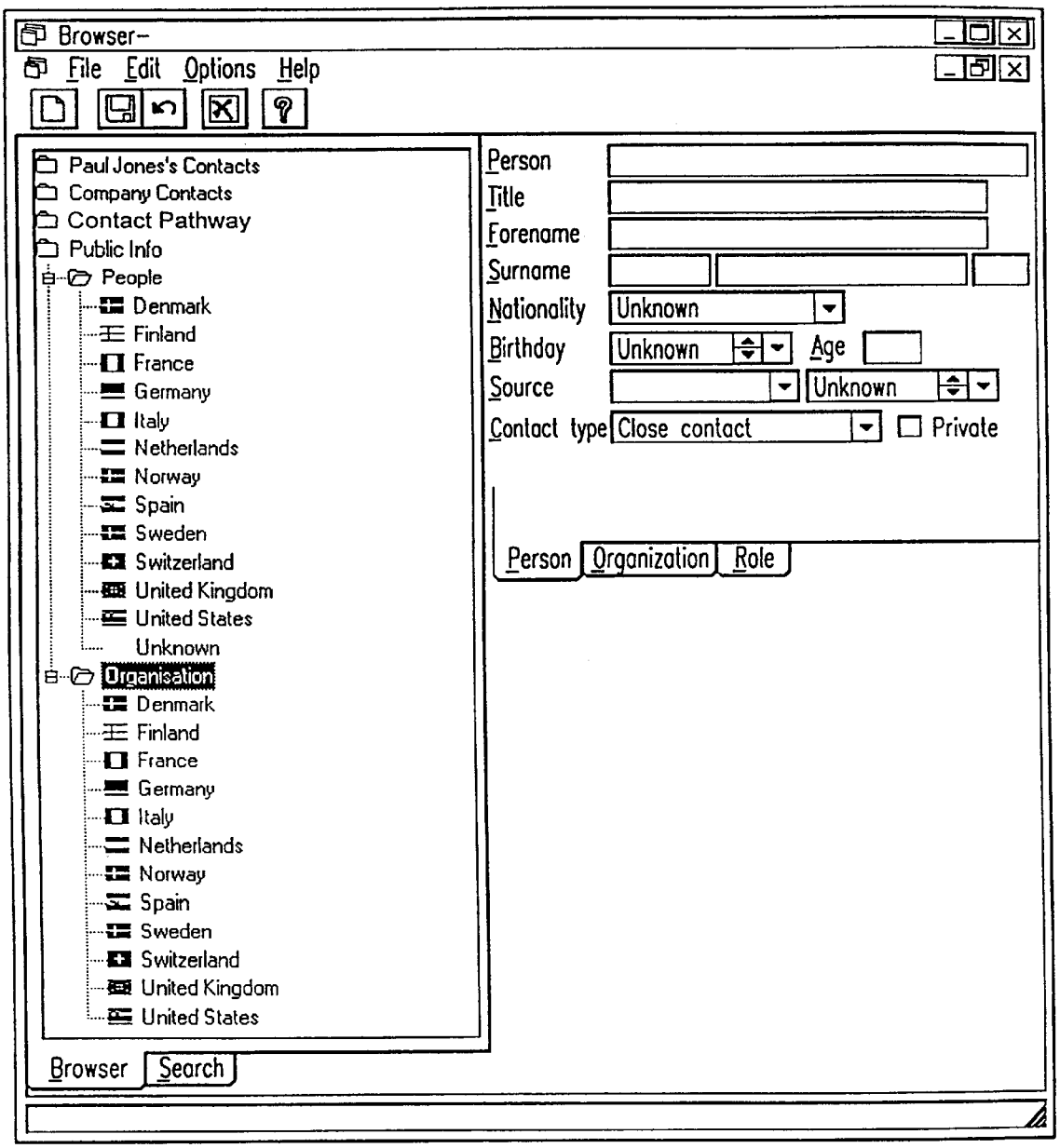

The "Public Information" browsing mode is divided into two information viewing folders—People and Organizations. That is, under the folder "Public Information" are the folders "People" and "Organizations" as shown in FIG. 18.

Figure 19:
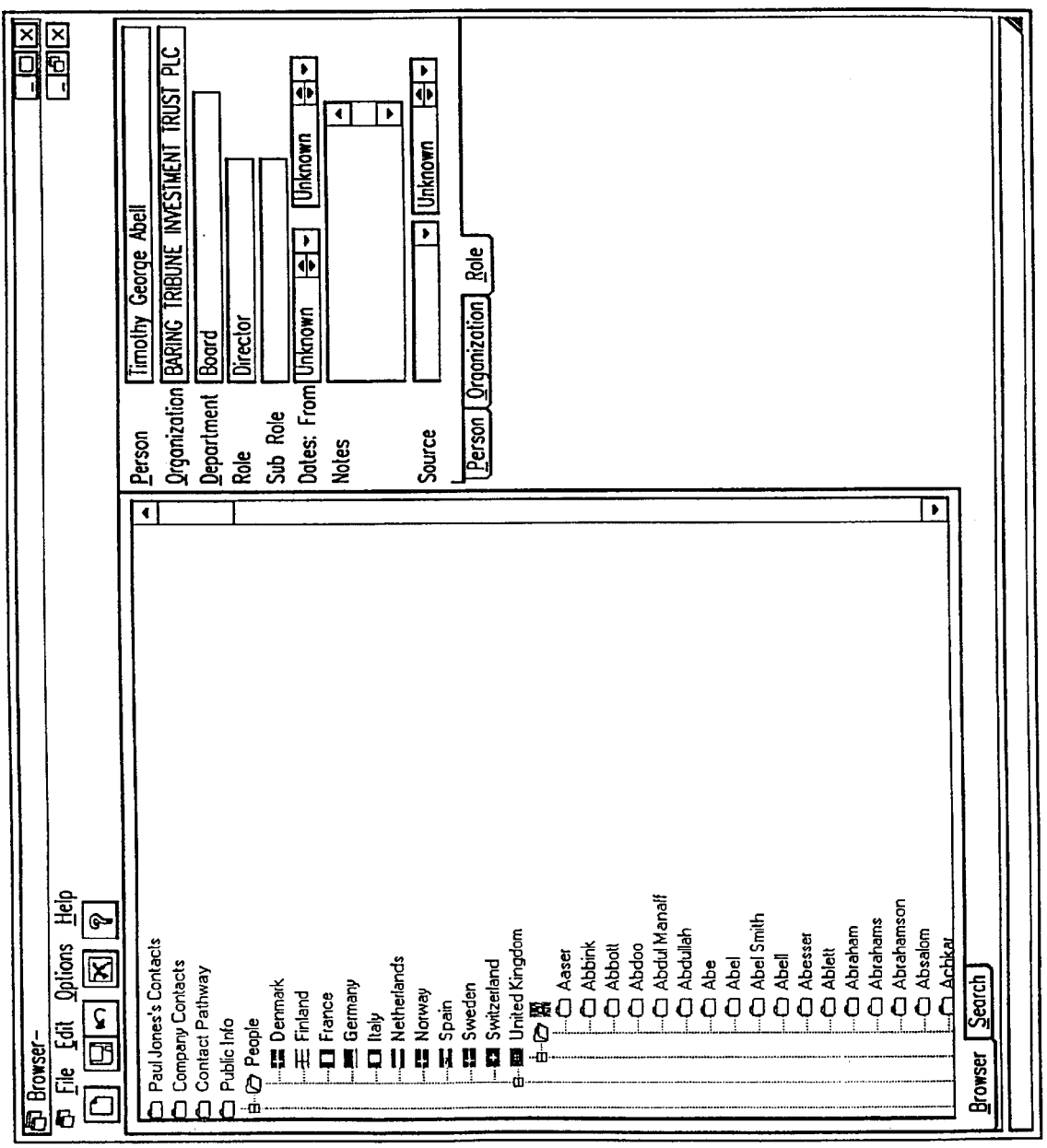

Referring to FIG. 19, opening the "People" folder reveals, under each country, an alphabetic list of people known to the CIDM system 100 (i.e., public database 102) within that nationality, in this case with United Kingdom nationality. There are two subfolders folders available to the user for browsing. Via the folder "Known By" the user can see who, if any, of their fellow company employees has access to the individual. The folder "Contact Pathway" shows the people and organizations to which the fellow employee has direct access to. When a surname is opened, a list of all the people in the database with that surname is displayed. In the example, we have the list of people with the surname Abell.

Figure 20:
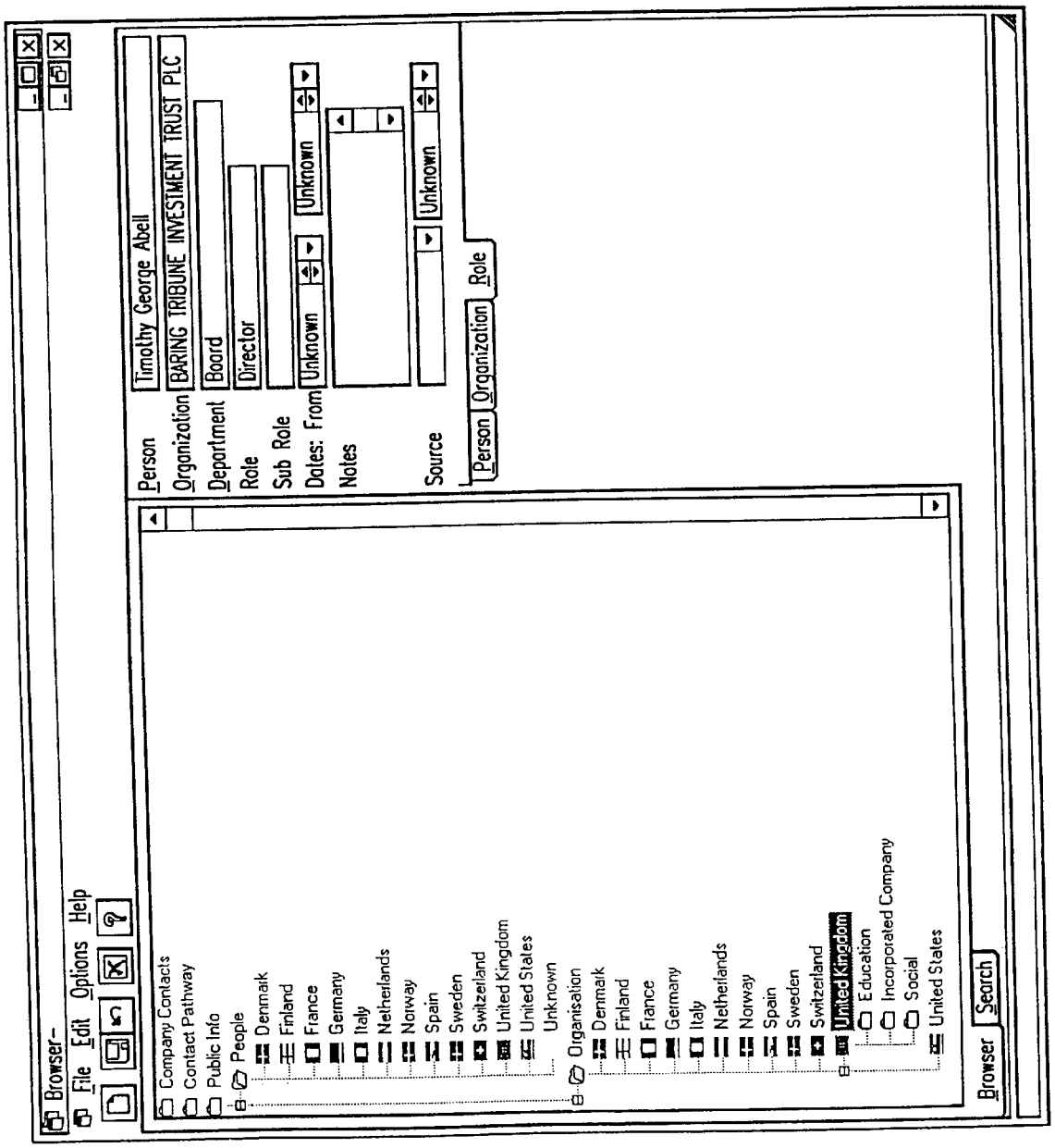
Figure 21:
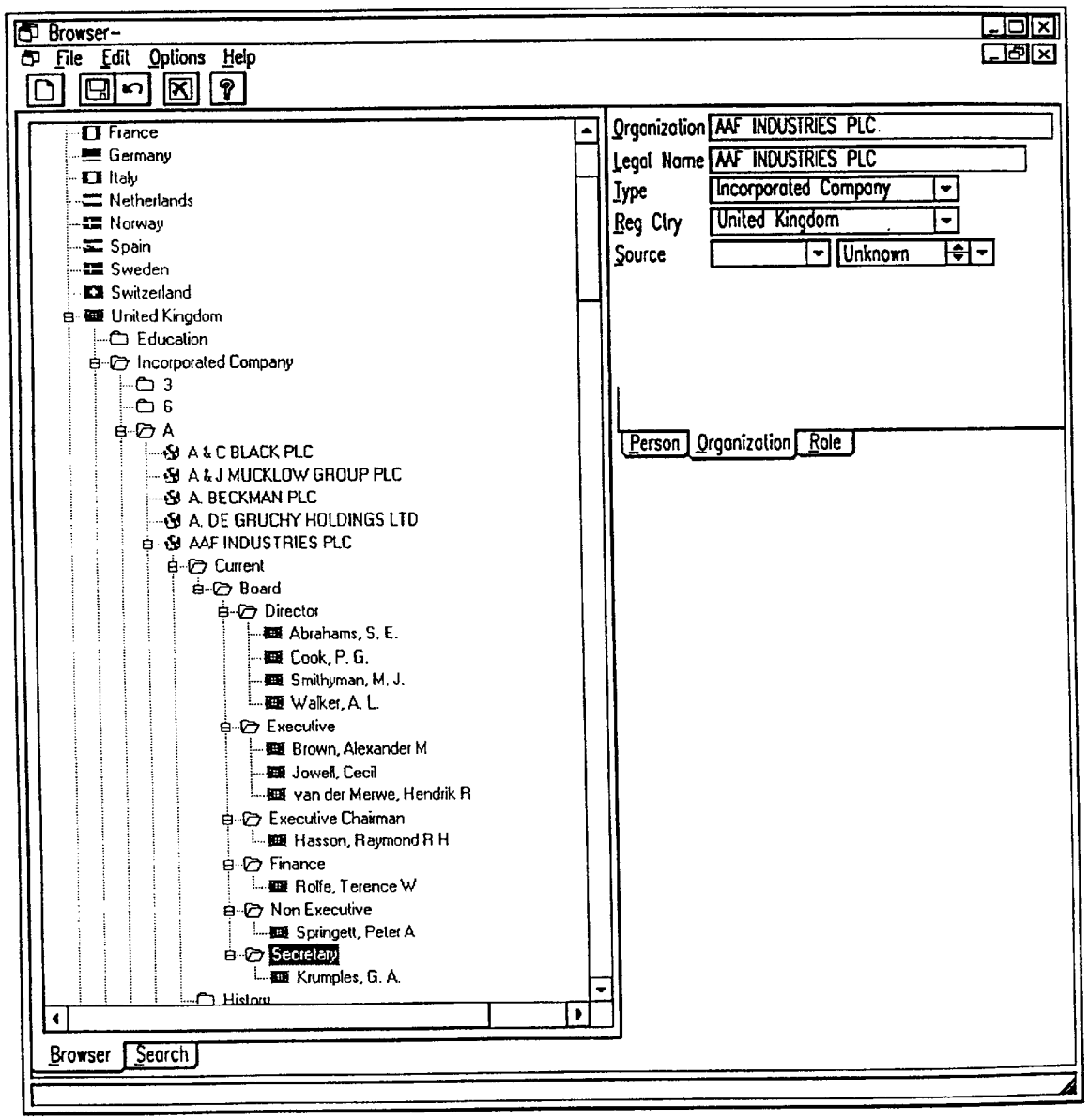

Referring to FIG. 20, opening the s folder reveals a list of all the organizations, organized by country, that are available within database 102 that users have access to. When the "Incorporated Company" subfolder is opened a list of all the organizations in alphabetical order is revealed as shown in FIG. 21. By clicking on one of them the user can see the individuals at a particular company and their roles. In this example, the Board of AAF INDUSTRIES PLC is revealed.

B. Search Modes

Figure 22:
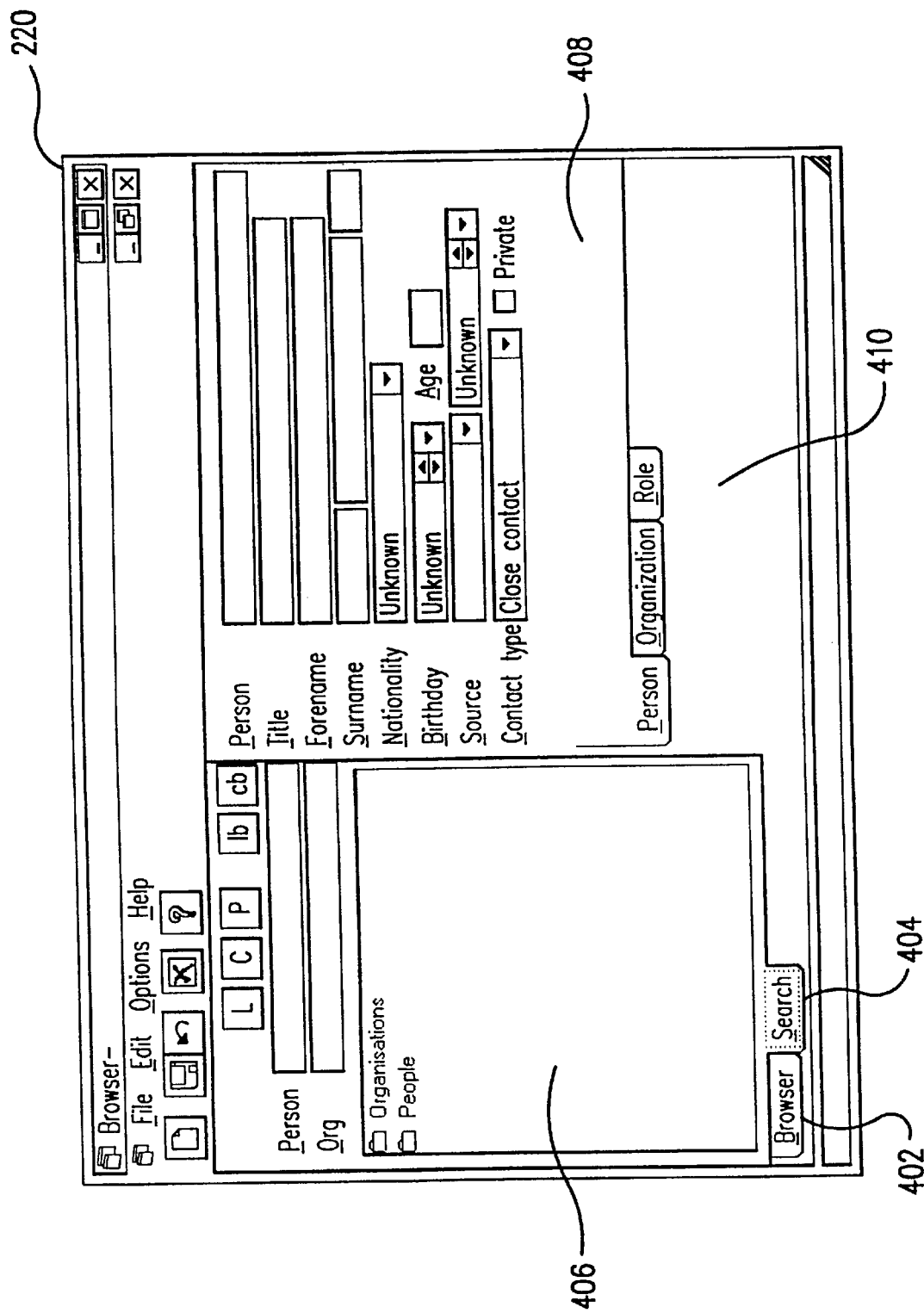

Referring to FIG. 22, a CIDM system 100 browser screen 2200 is shown, Screen 2200 would appear when toggle button 404 is clicked (as explained with reference to Referring to FIG. 4) and includes additional toggle buttons to perform the particular people, organization, or target searches as detailed in TABLE 3. A person input region 2202 allows a user to enter a search string to perform a people search, while an organization input region 2204 allows a user to enter a search string to perform an organization search. To perform a target search, the user would need to enter search strings into both the input regions 2202 and 2204.

In an embodiment of the present invention, the three different search modes (see TABLE 3), which are detailed below, are executed upon the user clicking one of the five search buttons 2206–2214, as applicable. Thus, any one of fifteen permutation of searches may be performed using the CIDM tool. The five search buttons are:

- A "Local" (L) search button 2206 searches the users' private database(s) 104 for direct contacts (i.e., "Do I have access to X?").
- A "Company" (C) search button 2208 searches the enterprise's private database(s) 104 for direct contacts (i.e., "Does my company have access to X?").
- A "Public" (P) search button 2210 searches the public database(s) 102 for contacts (i.e., "Is X in the public database[s]?").
- A "Local Contact Pathway" (LCP) search button 2212 searches the users' private database(s) 104 in conjunction with the public database(s) 102 for indirect contacts (i.e., "Do I have a contact pathway to X?").
- A "Company Contact Pathway" (CCP) search button 2214 searches the enterprise's private database(s) 104 in conjunction with the public database(s) 102 for indirect contacts (i.e., "Does my company have a contact pathway to X?").

In the above description it will be apparent to one skilled in the relevant art(s) that X may be a person, organization, or a targeted person at a specific organization as specified by the user in input regions 2202, 2204, and/or both, respectively.

1. Person

Figure 23:
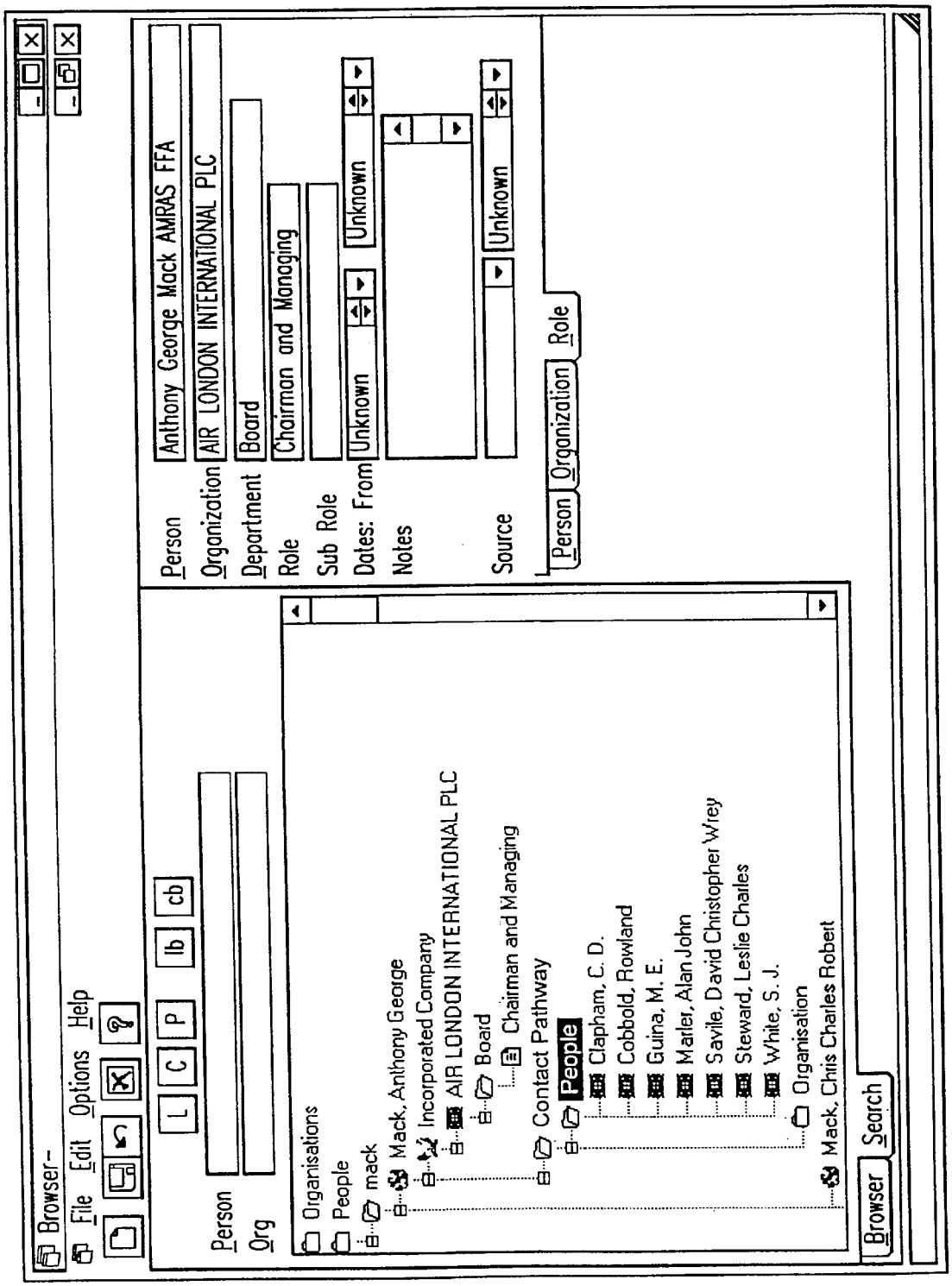

Referring to FIG. 23, the surname "Mack" is searched and a list of all individuals whose surname is "Mack" or begins with "Mack" (e.g., Mackay, Mackaness, etc.) is produced in alphabetical order. The user can click on any of the names produced and the company the person works for and their position will be displayed. The user can also obtain the person's contact pathway and ascertain who knows them within the user's company using (i.e., clicking) the "Contact Pathway" and "Known By" folders, respectively.

2. Organization

The public database 102 can be also searched for particular organizations. For example, the public database 102 is searched for organizations containing the keyword "bank" in their names, and a list is then produced in alphabetical order as shown in FIG. 24. The search can also be done using "key" terms or by introducing the first letters or words in the organization name.

3. Person at an Organization (Target)

In an embodiment of the present invention, as indicated in TABLE 3, a user may perform a search of the databases 102 and/or 104 in order to determine the contact pathway, if any exists, from the user to a targeted person at a specific organization (i.e., "Can I get to John Smith at XYZ Company and not any other John Smith?"). An exemplary search control flow is detailed below.

C Detailed Search Flow Example

Figure 27:
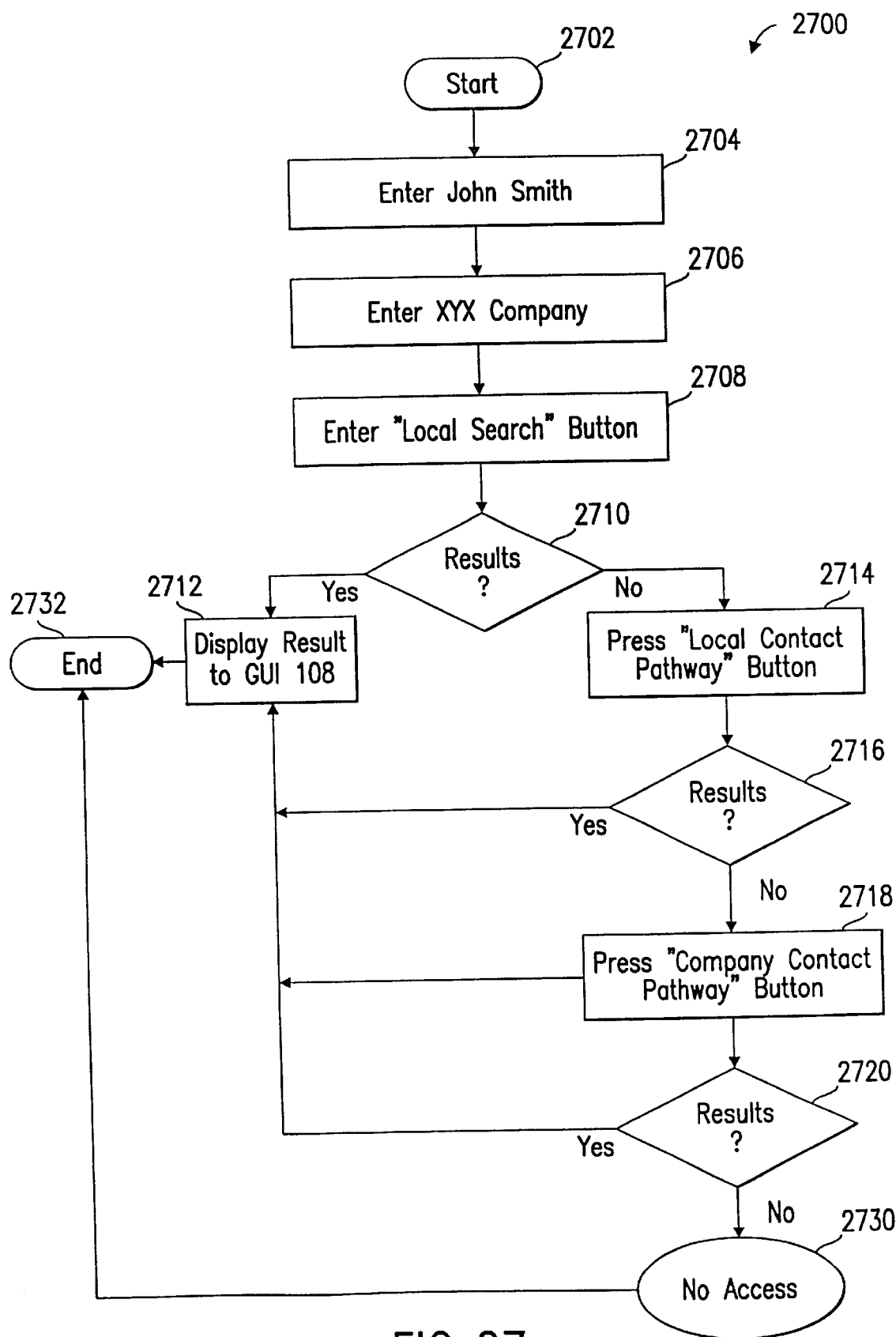
FIG. 27 is a flowchart depicting an embodiment of the operation and control flow of the contact data mining tool of the present invention.

Referring to FIG. 27, a flowchart 2700 depicting a search control flow according to an embodiment of the CIDM system 100 is shown. More specifically, flowchart 2700 depicts the control flow of the target search explained above with reference to FIG. 22.

Flowchart 2700 begins at step 2702 with control passing immediately to step 2704. In step 2704, the user may enter a search string into input region 2202 for a person they desire to reach. In step 2706, the user may enter a search string into input region 2204 for the specific organization where they desire reach the person entered in step 2704. In step 2708, the user would first click the "Local" (L) search button 2206. In step 2710, the CIDM system 100 responds to this input by searching the users' private database(s) 104 for direct contacts (i.e., "Do I have access to the inputted person at the inputted organization?"). If successful, the CIDM system 100 produces, in step 2712, a screen 108 which displays the relevant contact information (and allows the user to print the display). The control flow of flowchart 2700 may then end as indicated by step 2732.

If step 2710 is not successful, the user may then, in step 2714, click the "Local Contact Pathway" (LCP) search button 2212. In step 2716, the CIDM system 100 responds to this input by searching the users' private database(s) 104 in conjunction with the public database(s) 102 for direct contacts (i.e., "Do I have a contact pathway to the inputted person at the inputted organization?"). If successful the CIDM system 100 produces, in step 2712, a screen 108 which displays the applicable user contact pathway. The control flow of flowchart 2700 may then end as indicated by step 2732.

If step 2716 is not successful, the user may then, in step 2718, click the "Company Contact Pathway" (CCP) search button 2214. In step 2720, the CIDM system 100 responds to this input by searching the enterprise's private database(s) 104 in conjunction with the public database(s) 102 for contacts (i.e., "Does my company have a contact pathway to the inputted person at the inputted organization?"). If successful, the CIDM system 100 produces, in step 2712, a screen 108 which displays the applicable company contact pathway.

If step 2720 is not successful, the CIDM system, in step 2730, determines that the user has no access to the inputted person at the inputted organization and the control flow of flowchart 2700 may then end as indicated by step 2732.

D. Optimal Contact Pathways

Figure 28:
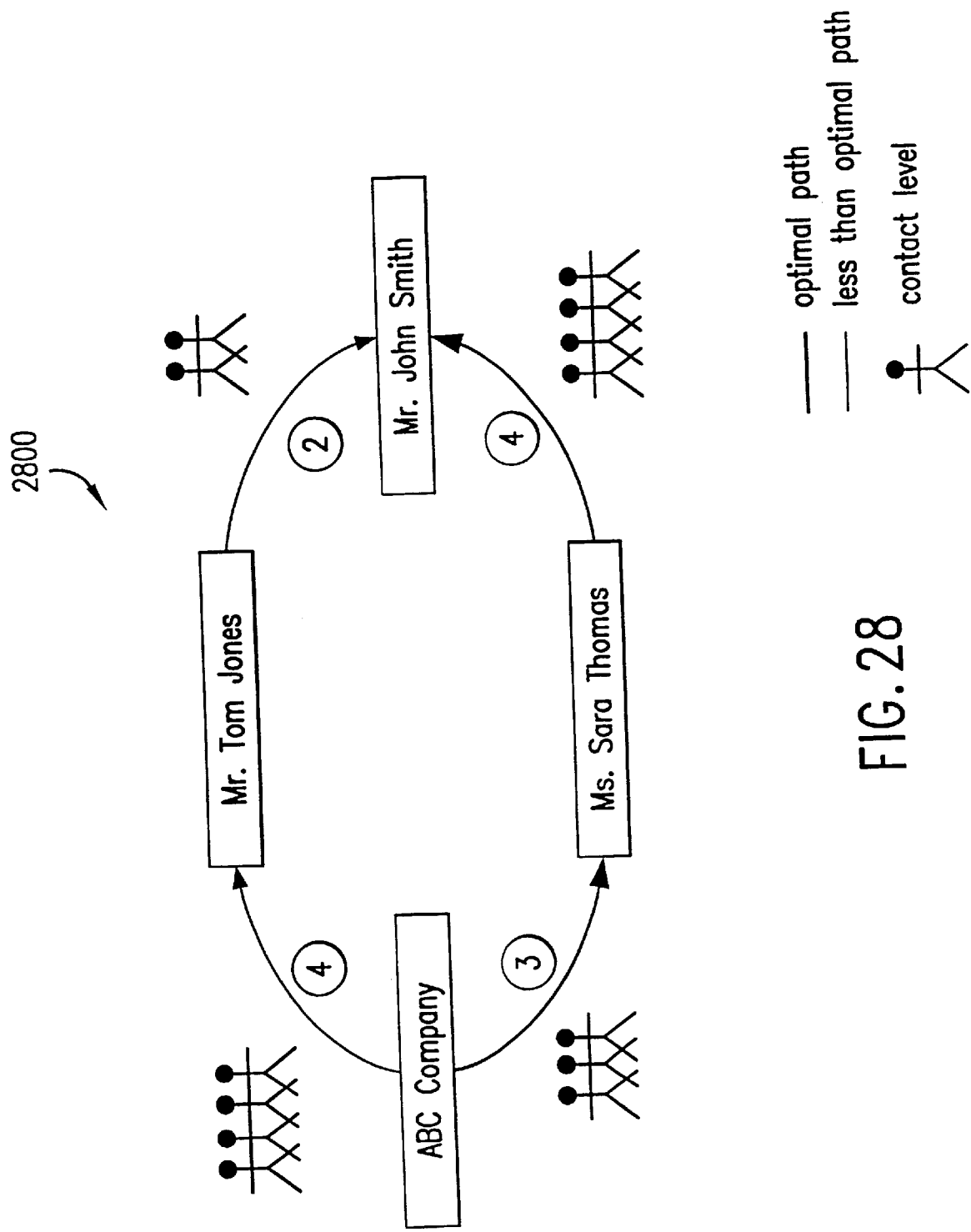
FIG. 28 is a block diagram illustrating the determination of an entity's optimal contact pathway according to an embodiment of the present invention.

Referring to FIG. 28, a block diagram 2800 illustrating the determination of an optimal contact pathway for an entity (i.e., user), according to an embodiment of the present invention, is shown. During the above-described browse and search modes, to locate the optimal contact pathway to, for example, a Mr. John Smith, the CIDM system 100 would use the ContactLevel field of the ContactType table 306 (see TABLE 1C and FIG. 3). In an enterprise embodiment of the CIDM system 100, an entity-user ABC Company may have two contacts who know Mr. John Smith. However, the contact pathway from Ms. Sara Thomas to Mr. John Smith is more optimal for the ABC Company than through Mr. Tom Jones—a less than optimal contact pathway. The CIDM system 100 uses the ContactLevel weighting that were entered during population of the private database 104. In an embodiment of the present invention, the ContactLevel field of the ContactType table 306 may be a numerical weight ranging from 1 (i.e., casual acquaintance) to 5 (i.e., very close friends or family). The exact description of the differing numeric ContactLevels is contained in the ContactType field of the ContactType table 306.

The contact pathway of FIG. 28 is a single step pathway presented for ease of explanation. In an embodiment of the present invention, however, the optimal generated contact pathway is a multi-step pathway where a user's optimal pathway includes a series of successive relationships to eventually reach a desired contact (e.g., "I know A, who knows B, who knows C, etc.").

VI. Exanple Implementations

Figure 29:
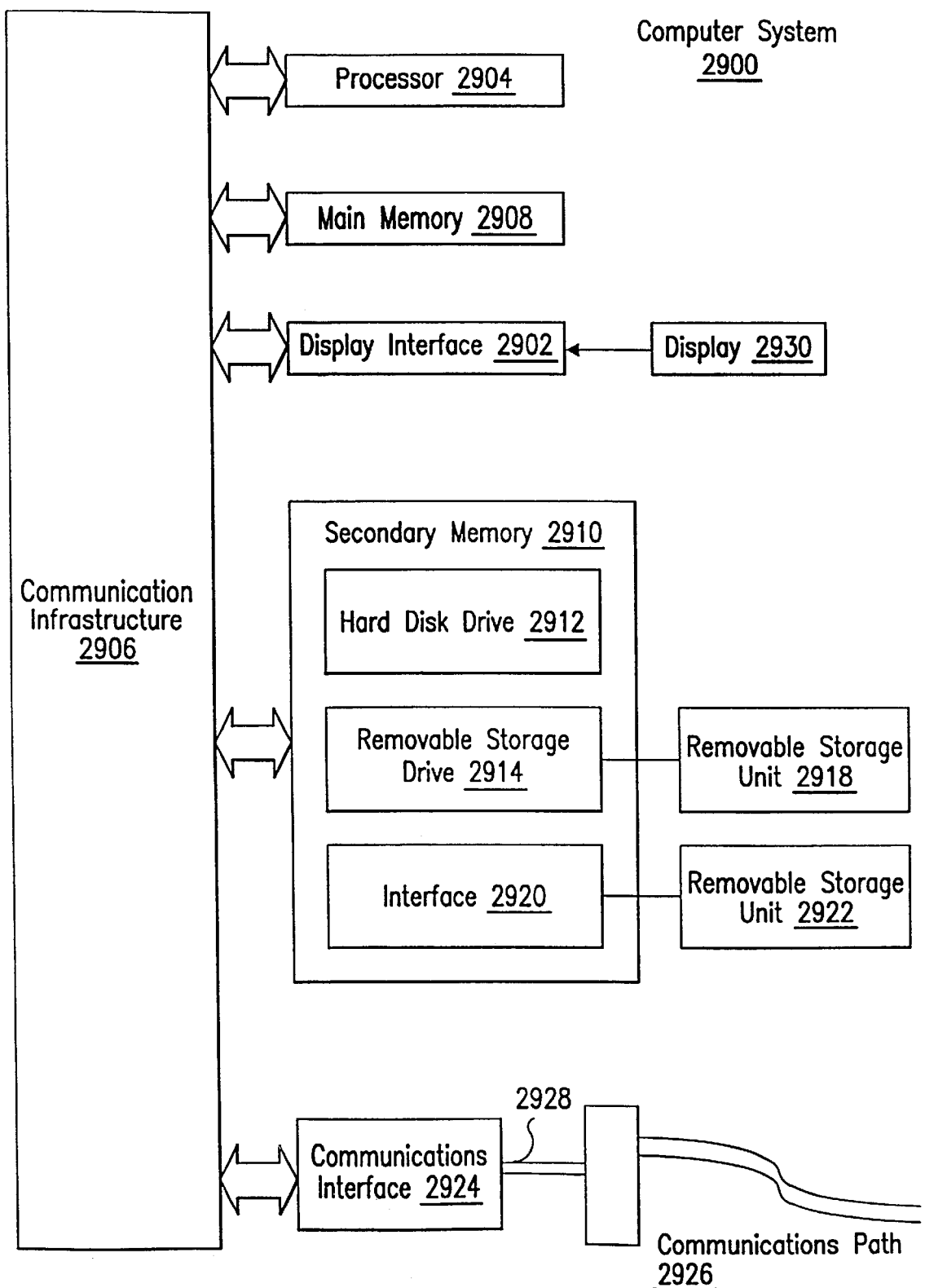
FIG. 29 is a block diagram of an exemplary computer system useful for implementing the present invention.

The present invention (i.e., CIDM system 100 or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 2900 is shown in FIG. 29. The computer system 2900 includes one or more processors, such as processor 2904. The processor 2904 is connected to a communication infrastructure 2906 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 2900 can include a display interface 2905 that forwards graphics, text, and other data from the communication infrastructure 2902 (or from a frame buffer not shown) for display on the display unit 2930.

Computer system 2900 also includes a main memory 2908, preferably random access memory (RAM), and may also include a secondary memory 2910. The secondary memory 2910 may include, for example, a hard disk drive 2912 and/or a removable storage drive 2914, representing a floppy disk drive, a magnetic tape drive, an optical disk drive, etc. The removable storage drive 2914 reads from and/or writes to a removable storage unit 2918 in a well known manner. Removable storage unit 2918, represents a floppy disk, magnetic tape, optical disk, etc. which is read by and written to by removable storage drive 2914. As will be appreciated, the removable storage unit 2918 includes a computer usable storage medium having stored therein computer software and/or data.

In alternative embodiments, secondary memory 2910 may include other similar means for allowing computer programs or other instructions to be loaded into computer system 2900. Such means may include, for example, a removable storage unit 2922 and an interface 2920. Examples of such may include a program cartridge and cartridge interface (such as that found in video game devices), a removable memory chip (such as an EPROM, or PROM) and associated socket, and other removable storage units 2922 and interfaces 2920 which allow software and data to be transferred from the removable storage unit 2922 to computer system 2900.

Computer system 2900 may also include a communications interface 2924. Communications interface 2924 allows software and data to be transferred between computer system 2900 and external devices. Examples of communications interface 2924 may include a modem, a network interface (such as an Ethernet card), a communications port, a PCMCIA slot and card, etc. Software and data transferred via communications interface 2924 are in the form of signals 2928 which may be electronic, electromagnetic, optical or other signals capable of being received by communications interface 2924. These signals 2928 are provided to communications interface 2924 via a communications path (i.e., channel) 2926. This channel 2926 carries signals 2928 and may be implemented using wire or cable, fiber optics, a phone line, a cellular phone link, an RF link and other communications channels.

In this document, the terms " computer program medium" and "computer usable medium" are used to generally refer to media such as removable storage drive 2914, a hard disk installed in hard disk drive 2912, and signals 2928. These computer program products are means for providing software to computer system 2900. The invention is directed to such computer program products.

Computer programs (also called computer control logic) are stored in main memory 2908 and/or secondary memory 2910. Computer programs may also be received via communications interface 2924. Such computer programs, when executed, enable the computer system 2900 to perform the features of the present invention as discussed herein. In particular, the computer programs, when executed, enable the processor 2904 to perform the features of the present invention. Accordingly, such computer programs represent controllers of the computer system 2900.

In an embodiment where the invention is implemented using software, the software may be stored in a computer program product and loaded into computer system 2900 using removable storage drive 2914, hard drive 2912 or communications interface 2924. The control logic (software), when executed by the processor 2904, causes the processor 2904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment the invention is implemented using a combination of both hardware and software.

VII. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for displaying contact pathways between entities, comprising, the steps of:
   (1) obtaining information associated with contacts of said first entity from a first private database;
   (2) obtaining information associated with contacts of said second entity from a second database;
   (3) determining a contact pathway between said first entity and said second entity using said information from said first private database and said information from said second database; and
   (4) displaying said contact pathway;
   whereby said contact pathway represents a path comprising of one or more other entities by which said first entity may have access to said second entity.

2. The method of claim 1, wherein said first entity and said second entity are any one of the following types of entities:

(i) a person; and (ii) an organization.

3. The method of claim 2, wherein said second database is one of the following:

(i) a public database; and (ii) a quasi-public database.

4. The method of claim 2, wherein said step (3) comprises the step of:

determining an optimal contact pathway between said first entity and said second entity, wherein said optimal contact pathway is determined by one of the following steps:

(i) identifying a contact pathway with the least number of other entities between said first entity and said second entity;

(ii) identifying a contact pathway with the greatest total of numerical weightings of other entities between said first entity and said second entity, wherein the level of familiarity of said first entity with the other entities in said pathway is associated with a numerical weight; and (iii) identifying a contact pathway resulting from performing a mathematical combination of steps (i) and (ii).

5. The method of claim 4, wherein said first entity is an organization and wherein information stored in said first private database that is associated with contacts of at least one person within said organization is restricted from other persons within said organization.

6. The method of claim 4, wherein said first entity is an organization and said step (1) comprises the steps of:

(a) obtaining information associated with contacts of each person of said organization from said first private database, wherein said obtained information is not restricted; and (b) obtaining information associated with contacts of said organization from said first private database.

7. The method of claim 6, wherein said step (1) further comprises the step of:

(c) obtaining private information associated with contacts of at least one person of said organization from said first private database, wherein said private information is restricted from other persons in said organization.

8. A computer program product comprising a computer useable medium having control logic stored therein for causing a computer to display contact pathways between entities, the computer control logic comprising:

first computer readable program code means for causing the computer to obtain information associated with contacts of said first entity from a first private database;

second computer readable program cod e means for causing the computer to obtain information associated with contacts of said second entity from a second database;

third computer readable program code means for causing the computer to determine a contact pathway between said first entity and said second entity using said information from said first private database and said information from said second database; and fourth computer readable program code means for causing the computer to display said contact pathway;

whereby said contact pathway represents a path comprising of one or more other entities by which said first entity may have access to said second entity.

9. The computer program product of claim 8, wherein said second database is one of the following:

(i) a public database; and (ii) a quasi-public database.

10. The computer program product of claim 8, wherein said third computer readable program code means comprises:

fifth computer readable program code means for causing the computer to determine an optimal contact pathway between said first entity and said second entity, wherein said optimal contact pathway is determined by one of the following computer readable program code means:

sixth computer readable program code means for causing the computer to identify a contact pathway with the least number of other entities between said first entity and said second entity;

seventh computer readable program code means for causing the computer to identify a contact pathway with the greatest total of numerical weightings of other entities between said first entity and said second entity, wherein the level of familiarity of said first entity with the other entities in said pathway is associated with a numerical weight; and eighth computer readable program code means for causing the computer to identify a contact pathway resulting from performing a mathematical combination of said sixth computer readable program code means and said seventh computer readable program code means.

11. The computer program product of claim 10, wherein said first entity is an organization and wherein information stored in said first private database that is associated with contacts of at least one person within said organization is restricted from other persons within said organization.

12. The method of claim 10, wherein said first entity is an organization and said first computer readable program code means comprises:

ninth computer readable program code means for causing the computer to obtain information associated with contacts of each person of said organization from said first private database, wherein said obtained information is not restricted; and tenth computer readable program code means for causing the computer to obtain information associated with contacts of said organization from said first private database.

13. The method of claim 12, wherein said first computer readable program code means further comprises:

eleventh computer readable program code means for causing the computer to obtain private information associated with contacts of at least one person of said organization from said first private database, wherein said private information is restricted from other persons in said organization.

14. A system for displaying contact pathways between entities, comprising:

(A) a private database for storing information associated with contacts of a first entity;

(B) a public database for storing information associated with a second entity;

(C) means for determining an optimal contact pathway between said first entity and said second entity, wherein said optimal contact pathway is determined by one of the following:

(i) first means for identifying a contact pathway with the least number of other entities between said first entity and said second entity;

(ii) second means for identifying a contact pathway with the greatest total of numerical weightings of other entities between said first entity and said second entity, wherein the level of familiarity of said first entity with the other entities in said pathway is associated with a numerical weight; and (iii) third means for identifying a contact pathway resulting from performing a mathematical combination of said first and second means for identifying a contact pathway; and (D) a graphical user interface for displaying said optimal contact pathway.

* * * * *